United States Patent [19]
McCool et al.

[11] Patent Number: 5,974,411
[45] Date of Patent: *Oct. 26, 1999

[54] N-WAY PROCESSING OF BIT STRINGS IN A DATAFLOW ARCHITECTURE

[75] Inventors: Michael W. McCool, Pasadena; Jean A. Marquis, Sierra Madre, both of Calif.

[73] Assignee: Sand Technology Systems International, Inc., Westmont, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/801,317

[22] Filed: Feb. 18, 1997

[51] Int. Cl.⁶ .............................. G06F 5/00; H03M 7/30
[52] U.S. Cl. ................. 707/3; 707/101; 341/51
[58] Field of Search ................ 707/1, 3, 4, 5, 707/6, 101; 341/51, 67

[56] References Cited

U.S. PATENT DOCUMENTS

| | | | |
|---|---|---|---|
| 5,036,457 | 7/1991 | Glaser et al. | 364/200 |
| 5,502,439 | 3/1996 | Berlin | 341/51 |
| 5,506,580 | 4/1996 | Whiting et al. | 341/51 |
| 5,550,540 | 8/1996 | Furlan et al. | 341/51 |
| 5,608,396 | 3/1997 | Cheng et al. | 341/50 |
| 5,610,603 | 3/1997 | Plambeck | 341/51 |
| 5,659,737 | 8/1997 | Matsuda | 395/612 |
| 5,664,172 | 9/1997 | Antoshenkov | 395/604 |

FOREIGN PATENT DOCUMENTS 2619940  3/1989  European Pat. Off. .

OTHER PUBLICATIONS

Aderson "Sublogarithmic Searching Without Multiplications", IEEE, pp. 655–663, 195.
Chiueh et al. "Vector Quantization Using Tree–Structured Self–Organizing Feature Maps" IEEE Journal o Selected Areas i Commuications, vol. 12, No. 9, pp. 1594–1599, Dec. 1994.
Hertampf et al. "On the Power of Polyomial Time Bit–Reductions" IEEE, pp. 200–207, 1993.
Masui "Keyword Dictionary Compression Using Trie Implementation", IEEE, pp. 438, 1991.
Van Houten et al. "An Algorithm for Tree Structure Compression" IEEE, 1991, p. 424.
Hitachi Data Systems; © Copyright Sand Technology Systems International, Inc., 1993, 1994, 1995, "Nucleus," pp. 1–8.

Primary Examiner—Thomas G. Black
Assistant Examiner—Michael J. Wallace, Jr.
Attorney, Agent, or Firm—Christie, Parker & Hale, LLP

[57] ABSTRACT

A method of processing bit vectors or raw bit strings wherein the bit vectors or raw bit strings are input to a binary tree structure of processing elements. Each processing element performs a boolean "OR" operation on a pair of inputs to produce an output stream of compressed bit string fragments. Processing takes place according to dataflow principles, wherein the processing element is activated when data is available at its inputs. The output compressed bit string fragments are buffered in a FIFO before being input to another processing element at a lower level of the binary tree. A resultant bit vector or raw bit string is output from the processing element representing the root node of the binary tree. The resultant bit vector or raw bit string is a representation of the result of the boolean "OR" of all inputs.

40 Claims, 25 Drawing Sheets

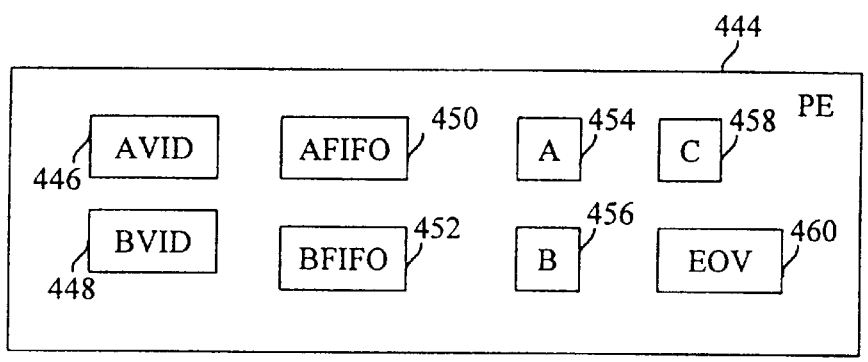
FIG. 11A
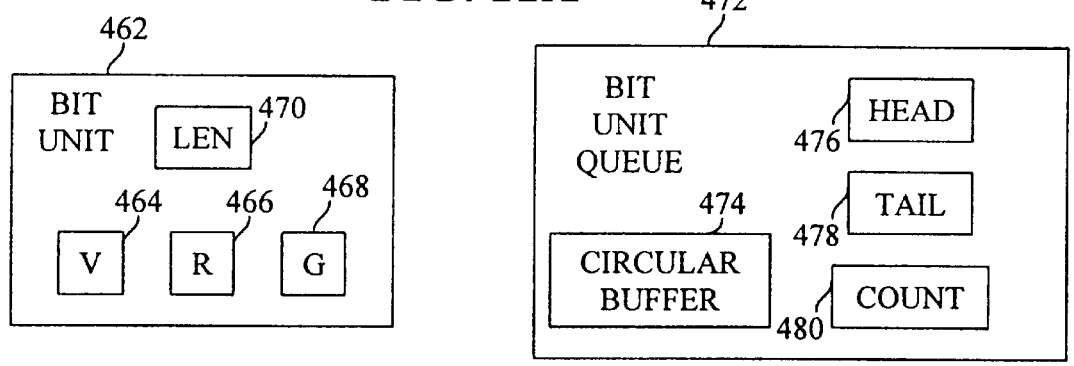
FIG. 11B
FIG. 11C

N-WAY PROCESSING OF BIT STRINGS IN A DATAFLOW ARCHITECTURE

FIELD OF THE INVENTION

This invention relates generally to a method and system for processing a plurality of bit strings in a computer system and more specifically to performing a boolean "OR" operation on a plurality of bit strings.

BACKGROUND OF THE INVENTION

Bit vectors (i.e., encoded bit strings) can be used in a relational database management system ("RDBMS") to represent instances of data items occurring within records stored in the database. A bit vector stores an encoded form of a bit string, i.e., a one dimensional array of 1's and 0's. The conventional approach to data storage in a relational database management system is to use collections of tables organized into rows and columns of data. Each column contains a particular type of information while each row consists of individual records of disparate information from each of the columns. Rows are contiguously stored as identically structured records. This record-oriented approach imposes large input and output (I/O) requirements, requires complex indexing schemes and demands periodic returning and denormalization of the data to achieve acceptable levels of performance.

A method for representing data in an RDBMS that substantially reduces these problems is described in International Application No. PCT/US88/03528, filed Oct. 7, 1988, the entire disclosure of which is incorporated herein by reference. The database is structured using a column-oriented approach that separates data values from their use in the database tables by using bit vectors. Rather than storing information as contiguous records, the data is stored in a columnar organization. The data values that make up each table are separated using bit vectors, each bit vector representing a unique value from each of the columns. Within each bit vector, a binary bit value indicates an incidence of a columnar value within a given record (or row). The bit vectors are used to represent values in an RDBMS, but can also be used for other applications.

As in any RDBMS, individual data records can be located by interrogating the database using queries. A common form of a query process involves a boolean operation operating on a pair of bit strings to form a resultant bit string representing those database records that satisfy the conditions of the query.

To save space in the database and reduce processing costs, the bit strings can be compressed, encoded and processed according to boolean operations as disclosed in U.S. Pat. No. 5,036,457 to Glaser et al., the entire disclosure of which is incorporated herein by reference. An encoded binary bit string is decoded, or a raw bit string is converted, into a series of bit units, a compressed binary bit form describing either a run or an impulse. A run refers to a bit string of one or more contiguous bits of the same binary value. An impulse refers to a bit string of one or more contiguous bits of the same binary value followed by an ending bit having a binary value opposite the bits of the same binary value. A boolean operation is performed on pairs of bit units, i.e., runs or impulses in compressed form, using an iterative looping construct to form a resultant bit unit. This technique is significantly faster than operating on each bit, one at a time, as is typically done in the art.

A pair of compressed impulses are obtained from a pair of encoded bit strings (i.e., bit vectors) or a pair of converted raw bits strings and the impulse with the shorter (called "minimal") length is selected. The boolean operation is performed for the number of bits in the minimal length impulse and a resultant bit unit of this minimal length is formed. This cycle is repeated for each of the remaining minimal length impulses. The total number of cycles required to perform the boolean operation approximately equals the sum of the number of impulses in the two input bit vectors, which is significantly less than the number of bits in the input bit vectors.

The computational overhead to process bit vectors with many short impulses becomes excessive using the minimal length method, although it is not generally a problem for bit vectors with many long impulses. Therefore, a method of performing boolean operations on a pair of encoded bit strings of indeterminate length was developed that avoids the computational overhead imposed by performing an iteration for each minimal length impulse. This method is described in U.S. patent application Ser. No. 08/566,005, filed Dec. 1, 1995, the entire disclosure of which is incorporated herein by reference. This method, called the "maxima" method, improved query processing by performing a boolean operation on bit vectors using a maximal length impulse instead of a minimal length impulse.

Despite the advances discussed above, further improvement in processing speed for queries in a large RDBMS is desirable. Prior methods operate only on a pair of bit strings at a time. When a combination of a larger number of bit strings are required to solve a query through pairwise "ORing" for example, multiple iterations of the minima or maxima methods are needed to process the bit strings. For example, if there are four input bit strings A, B, C and D, first A and B are processed as a pair outputting a result bit string E. Then E and C are processed to produce a result bit string F. Finally, F and D are processed to produce the resultant bit string. Production of this resultant bit string requires substantial processing overhead in the form of multiple procedure calls, context switching, and storage and recall of data structures such as the bit strings generated to represent the intermediate (and therefore temporary) processing values. To continue to improve query processing, a system and method supporting any number "N" of parallel input bit strings without the processing overhead of the current pairwise scheme is needed.

SUMMARY OF THE INVENTION

An embodiment of the present invention includes a method of performing a boolean operation on a plurality of input encoded bit strings or converted raw bit strings to produce one resultant encoded bit string or raw bit string comprising the steps of attaching each pair of input encoded bit strings or converted raw bit strings to selected ones of a plurality of processing elements, connecting the plurality of processing elements to form a binary tree having a plurality of levels, wherein the selected processing elements are leaf nodes of the binary tree, output bit units, compressed runs and impulses of the selected processing elements being input to intermediate processing elements which are non-leaf nodes at a level of the tree lower than the leaf nodes, output compressed runs and impulses of the intermediate processing elements being input to other intermediate processing elements at lower levels of the binary tree, the resultant encoded bit string or raw bit string being output by a root processing element which is the root node of the binary tree, processing all leaf nodes of the binary tree by performing the boolean operation on the input encoded bit strings or converted raw bit strings to the selected processing elements to produce output compressed runs and impulses, the output compressed runs and impulses becoming input compressed runs and impulses to the intermediate processing elements, processing all non-leaf nodes of the binary tree by performing the boolean operation on input compressed runs and impulses to the intermediate processing elements to produce output compressed runs and impulses, and processing the root node of the binary tree by performing the boolean operation on the input compressed runs and impulses to the root node processing element to produce the resultant encoded bit string or raw bit string.

According to another embodiment of the present invention, the foregoing and other advantages are attained by a system for performing boolean operations on a plurality of input encoded bit strings or converted raw bit strings to produce a resultant encoded bit string or raw bit string comprising a plurality of processing elements, each processing element comprising means for performing boolean operations on a pair of input compressed runs and impulses to produce output compressed runs and impulses; a first processing means for attaching each pair of input encoded bit strings or converted raw bit strings to selected ones of the processing elements; a second processing means for connecting the processing elements to form a binary tree having a plurality of levels, wherein the selected processing elements are leaf nodes of the binary tree, output compressed runs and impulses of the selected processing elements being input to intermediate processing elements which are non-leaf nodes at a level of the binary tree lower than the leaf nodes, output compressed runs and impulses of the intermediate processing elements being input to other intermediate processing elements at lower levels of the binary tree, the resultant encoded bit string or raw bit string being output by the root processing element which is the root node of the binary tree; and third processing means for processing all leaf nodes of the binary tree by initiating boolean operations on the input encoded bit strings or converted raw bits strings to the selected processing elements to produce output compressed runs and impulses, the output compressed runs and impulses becoming input compressed runs and impulses to the intermediate processing elements, processing all non-leaf nodes of the binary tree by initiating boolean operations on input encoded bit strings or converted bit strings to the intermediate processing elements to produce output compressed runs and impulses, and processing the root node of the binary tree by initiating boolean operations on input compressed runs and impulses to the root processing element to produce the resultant encoded bit string or raw bit string.

Additional advantages and novel features of the invention will be set forth in part in the description which follows, and will become apparent to those skilled in the art upon examination of the following or may be learned by practice of the invention. The following detailed description describes only the preferred embodiment of the invention, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIGS. 11A–11C are diagrams of data structures used during processing of the present invention.

DETAILED DESCRIPTION OF THE PREFERRED EMBODIMENT

I. Glossary

The following definitions will aid in the understanding of the material that follows.

"Bit String": refers to a string of binary bits (either a run or an impulse).

"Bit Vector": refers to an encoded form of a series of bit strings.

"Bit Unit": refers to a compressed form of a bit string fragment. Bit Units can be one of three distinct types: runs, impulses, and end-of-inputs (EOV).

"Run": refers to a bit string of one or more contiguous bits of the same binary value (or gender).

"Impulse": refers to a bit string of one or more contiguous bits of the same binary value (or gender) followed by an ending bit having a binary value opposite the bits of the same binary value.

"Characteristic Type": refers to an indicator that categorizes a bit unit as either a run or an impulse.

"Gender": refers to an indicator that indicates the binary value of a bit unit and is also interchangeably referred to as "polarity."

"Uncompressed form": refers to a one-dimensional array of binary bits (i.e., a raw bit string) that is either a run or an impulse.

"Compressed form": refers to a compact representation of a run or an impulse that indicates: (1) gender, (2) characteristic type, (3) length, and (4) end-of-input.

"Encoded form": refers to one or more contiguous impulses stored in a condensed format.

II. Hardware, Software and Firmware Embodiments

A. Computer System Description

Figure 1:
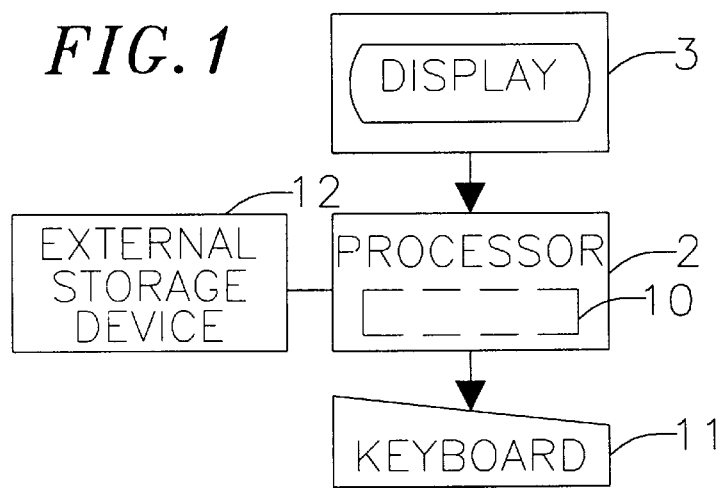
FIG. 1 is a functional block diagram of a computer system equipped with a computer platform for performing a boolean operation in accordance with the present invention.

FIG. 1 is a functional block diagram of a computer system equipped with a computer platform for performing a boolean operation in accordance with the present invention. The computer system includes a programmable processor 2 (preferably a microprocessor), display 3, keyboard entry device 11 for the processor 2 and an external storage device 12 for the storage or buffering of the bit strings. Conversion hardware, software or firmware and boolean operation hardware, software or firmware are housed in a computer platform 10 (shown in phantom lines) built into the processor 2. The computer platform 10 coordinates the various activities related to performing boolean operations on bit strings, such as is shown in U.S. Pat. No. 5,306,457 to Glaser et al.

Conventionally, the computer platform 10 is a general purpose programmable computer constructed on a printed circuit board which can easily be employed within most standard computer systems, including personal, mini and mainframe computers with computer program software for directing its operations as disclosed herein. It is also envisioned that the computer platform 10 can be a special purpose computer formed on an integrated circuit chip (or set of chips) or executable computer code burned into a read-only memory (ROM) chip that can be read in by conventional means or as microcode.

B. Computer Platform Description

Figure 2A:
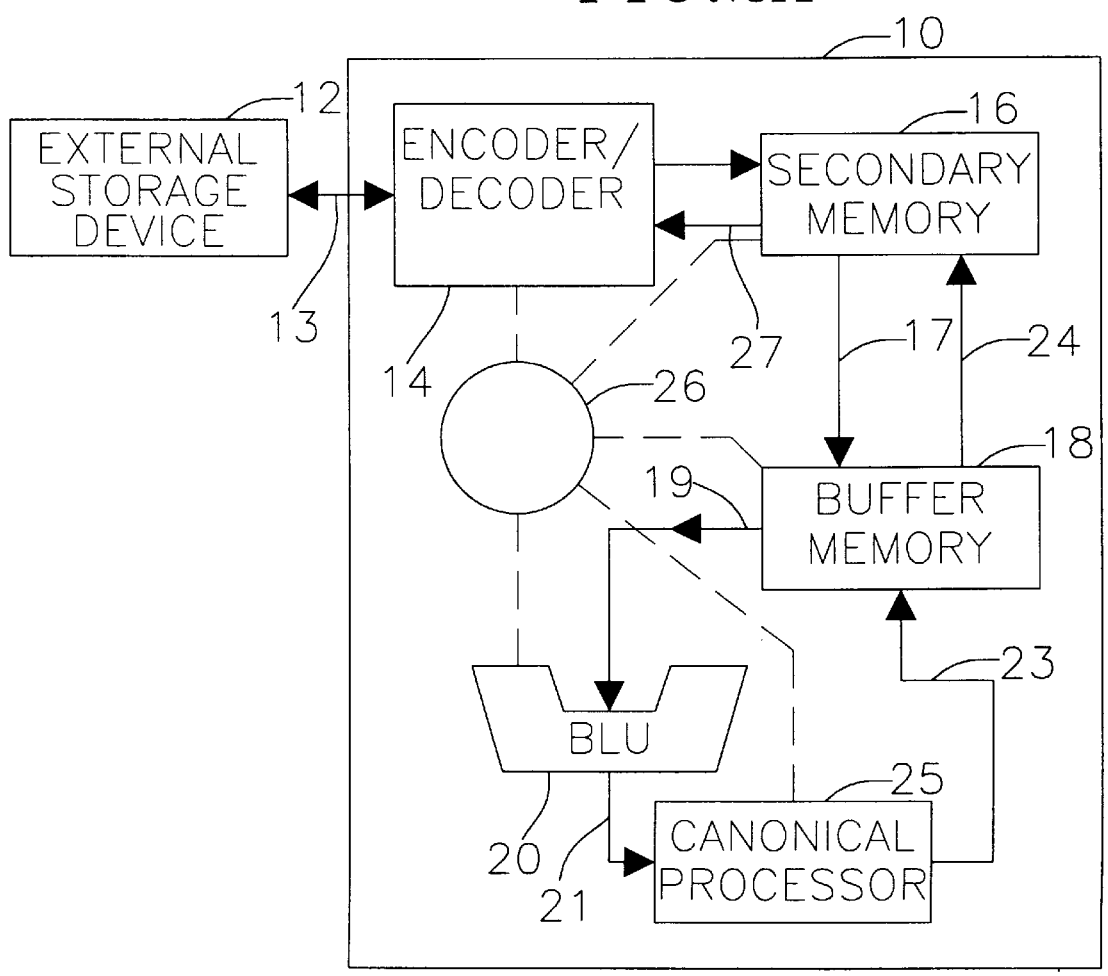
FIG. 2A is a functional block diagram of the computer platform of FIG. 1 including an encoder/decoder.

FIG. 2A is a functional block diagram of the computer platform of FIG. 1 including an encoder/decoder. More particularly, the computer platform 10 includes an encoder/decoder 14, an optional secondary memory 16 (which can be located external to the computer platform 10) interconnected to an optional buffer memory 18 by buses 15 and 27, at least one boolean Logic Unit (BLU) 20, a canonical processor 25 and a system coordinator 26. When software programs (described further below) for encoding/decoding the bit vectors or converting raw bit strings, processing the boolean operations and coordinating data transfer between the components, are loaded into the computer platform 10, the computer platform 10 is formed and ready for processing.

A detailed discussion of the specific components of the computer platform 10 is now presented. The external storage device 12 is a permanent or buffer storage unit, typically a hard disk, for storing bit strings (both encoded and raw bit strings). The bit strings are representative of organized data (such as relations) in a relational database, unorganized data acquired by external communications means or any other type of data that can be represented by a contiguous sequence of bits.

The contents of the external storage device 12 are loaded by a bus 13 to the computer platform 10 and into the encoder/decoder 14 which separates encoded bit strings into one or more bit units (i.e., compressed impulses). An impulse is described throughout this document as having an ending bit of opposite polarity, but the description applies equally to an impulse having a starting bit of opposite polarity. Also, the terms "polarity" and "gender" are used interchangeably and simply refer to binary value. The routines executed by the encoder/decoder 14 for encoding/decoding the bit strings into/from one of four different encoded formats are described in U.S. Pat. No. 5,036,457 to Glaser et al.

The optional secondary memory 16 stores the bit units for future boolean operations and can be a memory component included in the processor or a memory component included within the computer platform 10. The buffer memory 18 is another memory area for holding bit units temporarily before processing at the BLU 20 or before storing into the secondary memory 16 after processing.

A set of BLUs 20 (only one of which is shown in FIG. 2) perform boolean operations on the plurality of bit strings by utilizing a BLU embodiment implemented on a microprocessor (not shown), such as a PENTIUM microprocessor commercially available from Intel Corporation, or an ALPHA microprocessor commercially available from Digital Equipment Corporation. Some or all of the boolean operations can be much more efficiently implemented in hardware. However, even if the boolean operations are implemented primarily in software, a single BLU 20 can perform the boolean operations more efficiently in terms of storage, speed and so forth than presently known techniques for performing boolean operations on encoded bit strings or converted raw bit strings.

Once a resultant bit unit, that is, the result from performing a boolean operation on a plurality of bit units, has been determined by the BLU 20, the resultant bit unit is sent by a bus 21 to the canonical processor 25, which is essentially a pair of buffers for temporarily holding resultant bit units (which may be runs) until they can be combined into a compressed impulse. When a compressed impulse is formed at the canonical processor 25, the impulse is output by a bus 23 to the buffer memory 18 for encoding The system coordinator 26 controls the processing of data on the computer platform 10. The operation of the bus system and the operation of the components on the computer platform 10 are controlled by software programs in the system coordinator 26. The dotted lines of FIG. 2 leading out from the system coordinator 26 show its control over the various components.

Figure 2B:
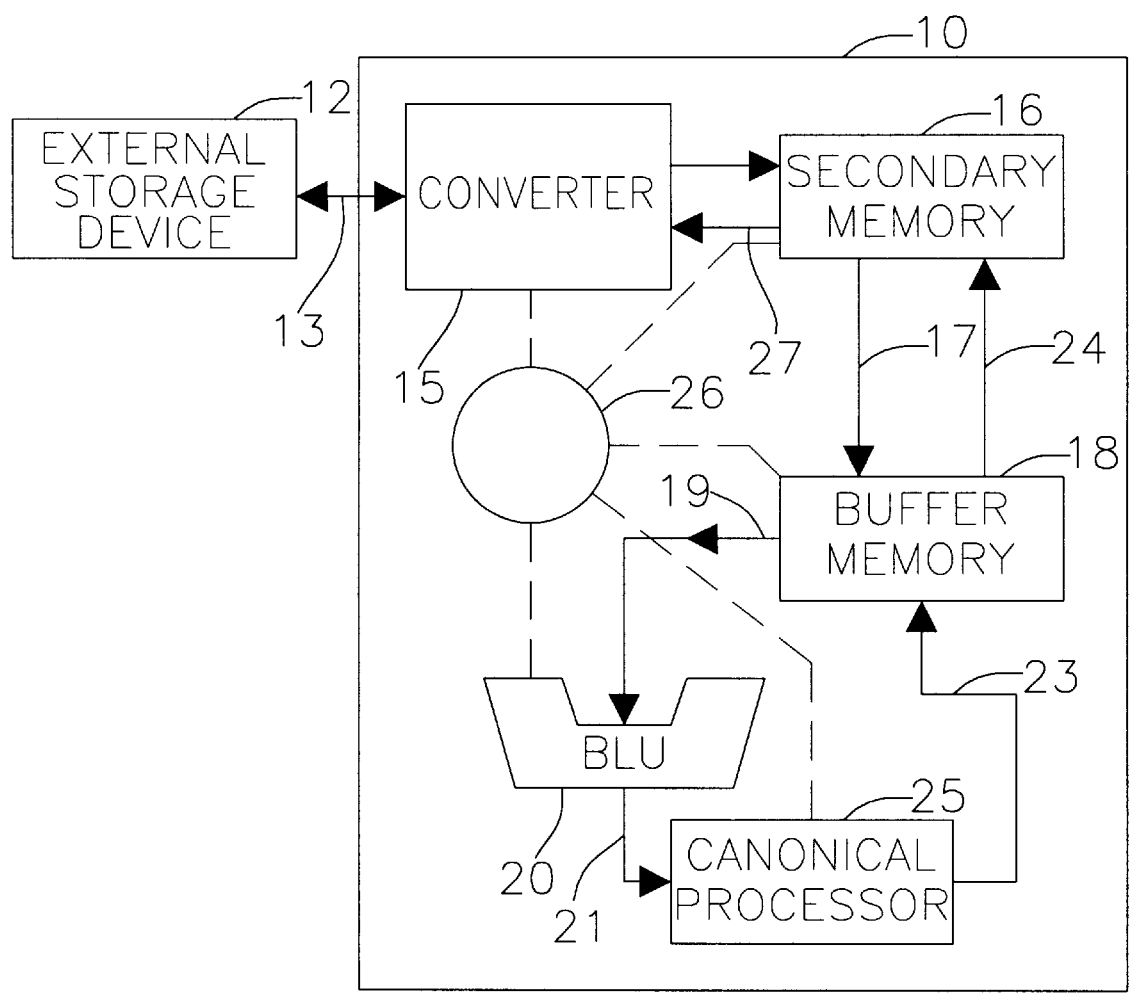
FIG. 2B is a functional block diagram of the computer platform of FIG. 1 including a converter.

FIG. 2B is a functional block diagram of the computer platform of FIG. 1 including a converter. This embodiment functions in the same manner as the embodiment of FIG. 2A, except the encoder/decoder 14 is replaced by converter 15. Converter 16 converts raw bit strings into compressed impulses for further processing by the computer platform 10.

III. Bit String Formats

Figure 3A:
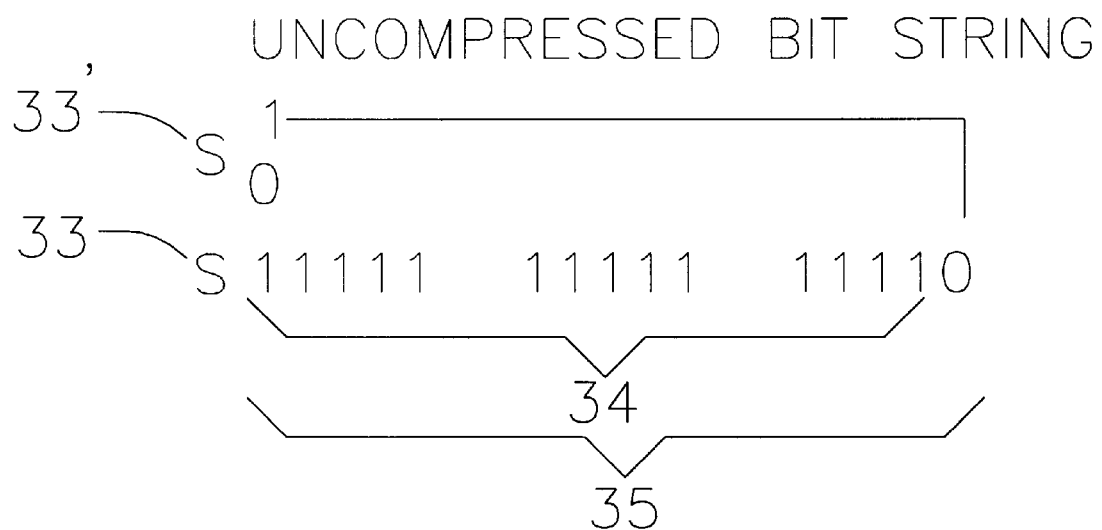
FIG. 3A and 3B depict, by way of example, an uncompressed bit string and a compressed bit string.
Figure 3B:
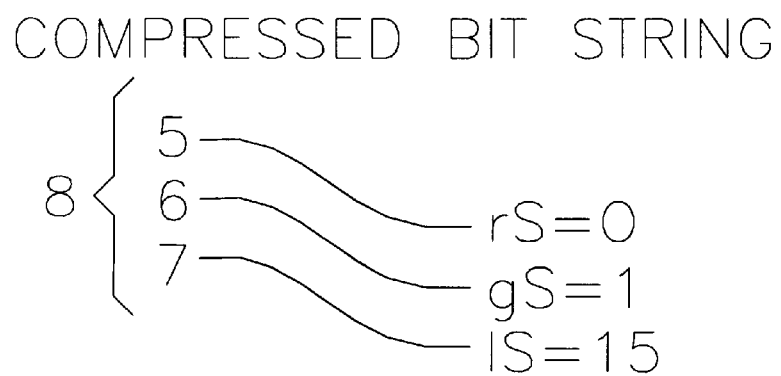

FIG. 3A and 3B depict, by way of example, an uncompressed bit string and a compressed bit string. An uncompressed bit string is shown pictorially as binary bit values 33 and as binary valued wave form 33'. The binary bit values will be referred to throughout this document, but the same description applies interchangeably to binary valued wave forms.

A. Uncompressed Format

The two types of bit string patterns shown are a run 34 and an impulse 35. These are both raw bit strings as described above.

B. Compressed Format

Each bit string pattern, such as run 34 or impulse 35, can be represented by attributes 5, 6, 7 describing the bit string in a compressed form. This compressed form is referred to as a "bit unit". A boolean operation can be performed using attributes 5, 6, 7 without the need to uncompress the bit string. In the described embodiment, the input attributes include a characteristic type rS 5; a gender gS 6; and a length lS 7. The characteristic type rS 5 "0" or "1" indicates the slice is, respectively, an impulse 35 or a run 34. The gender gS 6 "0" or "1" identifies the gender of the one or more contiguous bits preceding the ending bit. The length lS 7 indicates the number of bits occurring in the bit string. The example of FIG. 3 shows an impulse, that is, rS=0, contiguous bits having a gender of "1," that is, gS=1, with a length of 15 bits, that is, lS=15.

Although the described embodiment exclusively operates on compressed formats, the present invention can be extended to raw uncompressed bit strings by compressing them as follows. For each uncompressed bit string 33, each bit unit 34, 35 is formed by serially reading into a memory (not shown) one or more contiguous bits of the same gender, that is, a run 34, and counting the contiguous bits until a single bit of gender opposite that of the run 34, that is, an ending bit, is read. The attributes 5, 6, 7 are created as each impulse of a bit string is converted from uncompressed to compressed form. A "0" is stored in the characteristic type rS 5 to indicate a bit string that is an impulse 35, as well as the appropriate gender for the impulse in gender gS 6, and the bit count as length lS 7. After the boolean operation has been completed, the resultant bit units can optionally be converted back into an uncompressed raw bit string 33.

Generally, a pair of input bit vectors form slices A and B and comprise characteristic types rA and rB, genders gA and gB and lengths lA and lB, respectively, wherein the lengths are the lengths of the impulses and the characteristic types rA and rB are determined from the following equations:

$$rA = (lA < lB) \quad (1)$$

$$rB = (lA > lB) \quad (2)$$

where lA and lB are the lengths defined above. Equations (1) and (2) return either a "0" or "1" to indicate that the shorter of slices A and B is to be processed as a run and the longer is to be processed as an impulse 35, respectively and store the returned values as the characteristic types rA and rB. Equality of lengths is represented by the boolean condition ~rA & ~rB which indicates that both bit slices are impulses of the same length.

C. Relationships Between Bit String Formats

Figure 4:
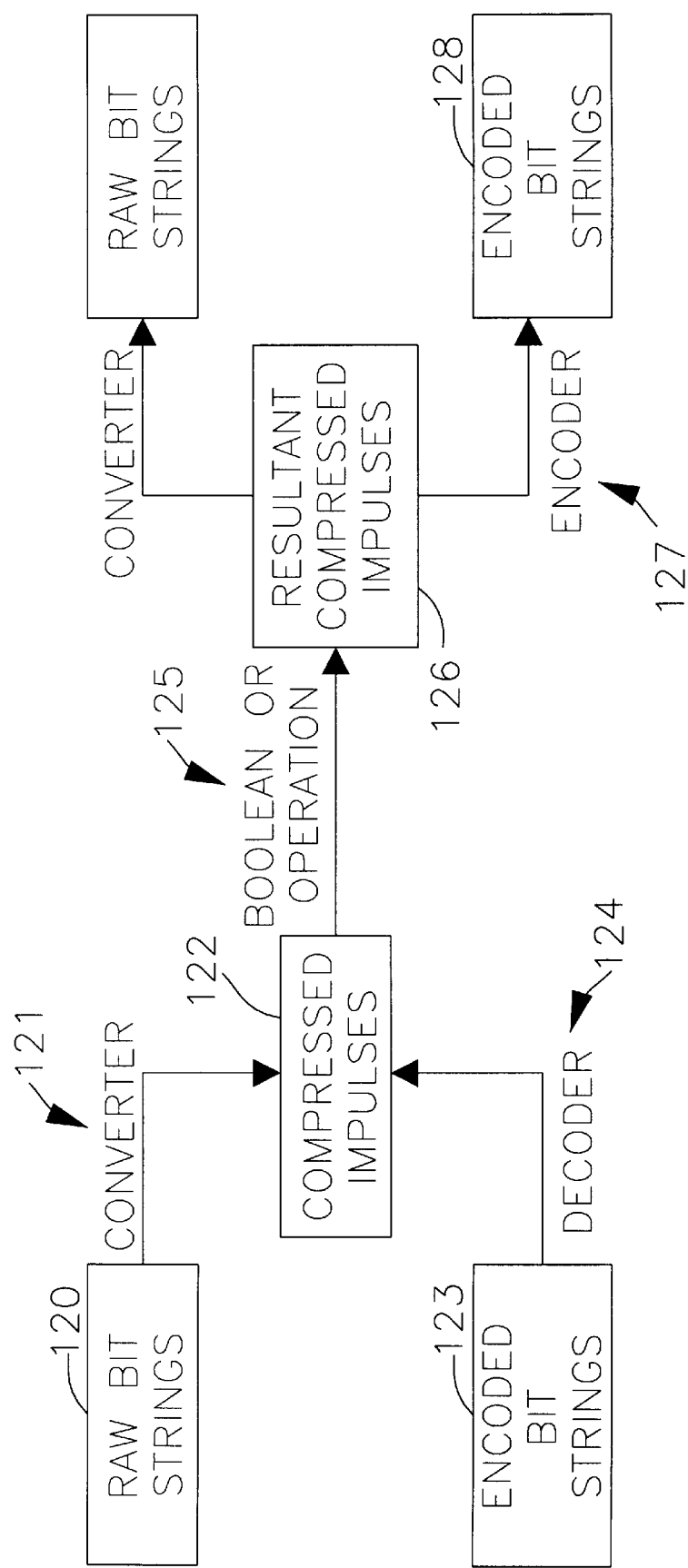
FIG. 4 is a flow chart depicting the relationships between raw bit strings, encoded bit strings and compressed impulses.

FIG. 4 is a flow chart depicting the relationships between raw bit strings, encoded bit strings and compressed impulses (i.e., bit units). Raw bit strings (block 120) are converted into compressed impulses (block 122) by bit string converter means 121, preferably the processor 2. Encoded bit strings (block 123) are decoded into compressed impulses (block 122) by decoder means 124, preferably the encoder/decoder 14.

Boolean OR operations 125 are performed in accordance with the present invention on a plurality of compressed impulses (block 122) to form resultant compressed impulses (block 126). Optionally, the resultant compressed impulses (block 126) are translated into encoded bit strings (block 128) by encoder means 127, preferably the encoder/decoder 14.

The dataflow architecture model of the present invention (discussed further below) is a generalization of this process where compressed impulses 122 are consumed and resultant compressed impulses 126 are produced in a binary tree configuration of processing elements (PEs) performing boolean "OR" operations 125. The root node of the dataflow architecture model is the only node to use an encoder 127. The leaf nodes of the dataflow architecture model are the only nodes to need to the decoder means 124 or the converter means 121. The interior or intermediate nodes of the dataflow architecture model communicate using First-In-First-Out buffers (FIFOs) of compressed bit units.

IV. Dataflow Architecture Model

The internal computer organization of the present invention is based on a dataflow architecture. Dataflow is a generic term that pertains to algorithms or machines whose actions are determined by the availability of the data needed for these actions. Dataflow algorithms can be represented as directed graphs in which the arcs are data paths and the nodes are operations to be performed on the data tokens arriving on the incoming arcs. The present invention is a representation of a dataflow machine.

A. Processing Elements

Figure 5A:
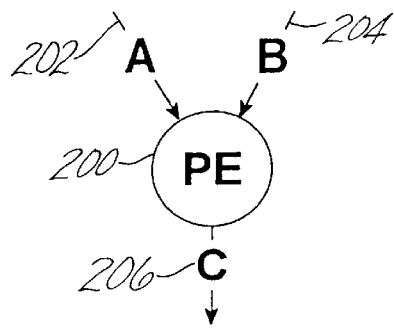
FIG. 5A is a diagram of a single node in the present dataflow architecture model.

FIG. 5A is a diagram of a single node in the present dataflow architecture model. A node in the present invention is called a Processing Element (PE) 200. Each PE accepts two input bit units and produces one output bit unit. In the preferred embodiment of the present invention, the PE performs a boolean "OR" operation on the two inputs to produce the output, although other boolean operations or other processing may also be implemented. Each PE in the dataflow architecture model is a BLU as described above. The input bit units are named A 202 and B 204, and the output bit unit is named C 206. The output C is stored in a first-in-first-out (FIFO) queue (not shown). The inputs A 202 and B 204 are either two input bit strings or two FIFO buffers containing a plurality of bit units which are output from two other PEs.

Figure 5B:
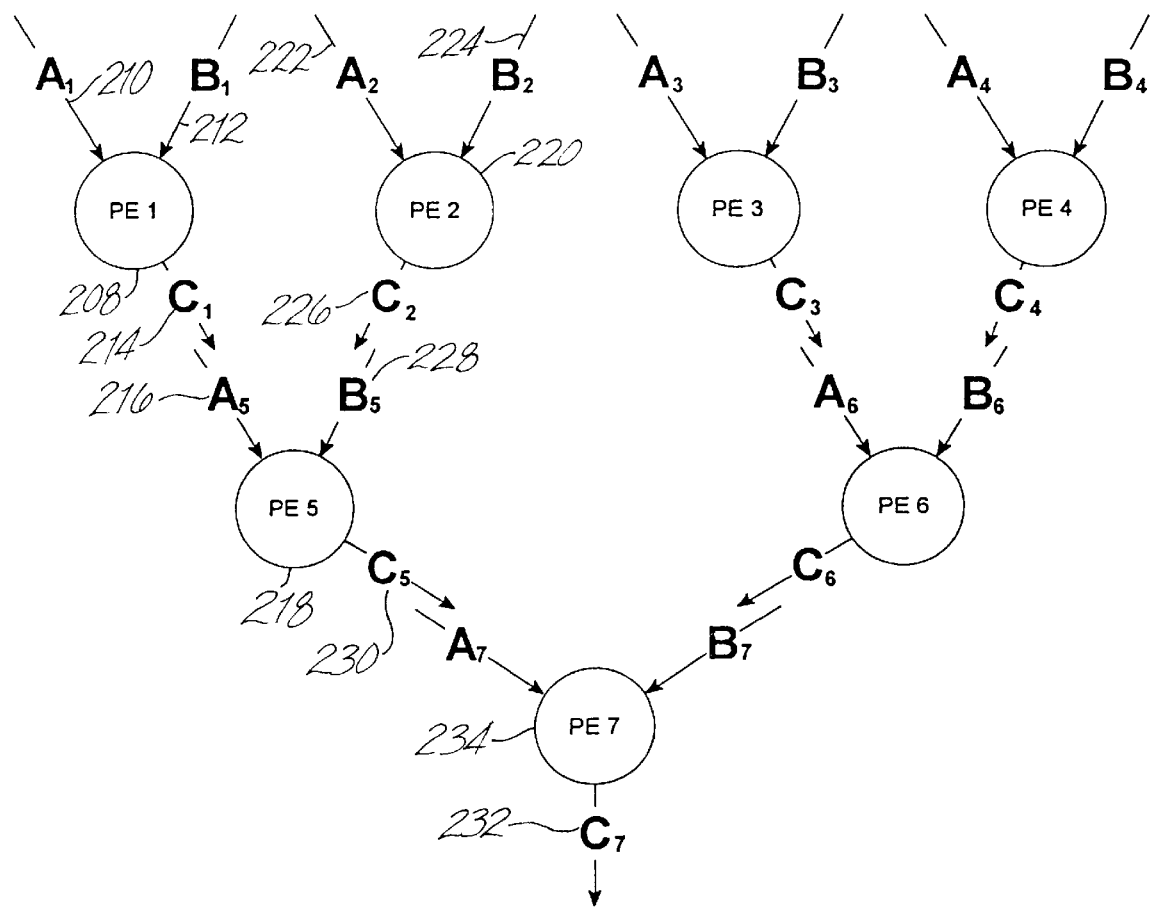
FIG. 5B is a diagram of a binary tree of nodes in the present dataflow architecture model.

FIG. 5B is a diagram of a binary tree of nodes in the present dataflow architecture model. In the example shown, each PE is a numbered process in a network of PEs. The network is structured as a binary tree to produce one output bit string from many input bit strings. The binary tree has multiple levels, with the leaf nodes of the tree at the "highest" level of the tree and the root node at the "lowest" level of the tree. Processing Element (PE) 1 208 reads the input bit strings A1 210 and B1 212 connected to PE 1 and produces an output stream of bit units C1 214. The output bit units C1 214 are stored in a FIFO (not shown) and read as the A5 216 input by PE 5 218. Processing Element 2 220 reads the input bit strings A2 222 and B2 224 connected to PE 2 and produces an output stream of bit units C2 226. The output bit units C2 226 are also stored in a FIFO different than the first FIFO (also not shown) and read as the B5 228 input by PE 5 218. PE 5 reads input FIFOs fed by A5 216 and B5 228 to produce output stream of bit units C5 230. Other PEs are connected to input bit strings and output FIFOs in a similar manner, until a resultant output bit string C7 232 is generated by root node PE 7 234.

Each numbered process can occur simultaneously. As input FIFOs of a PE contain input data for the PE, the PE can perform its processing to produce output data to be stored in its output FIFO. The only hindrance to a PE operating is when either one of the input FIFOs is empty. In one embodiment implemented in software, this never occurs because the PEs are processed in the following ordered manner and the minima method guarantees the output FIFO will fill up before the input FIFOs are emptied. Using the minima method, it is guaranteed that the result will always be the shorter of the two input lengths. Thus, even if one input had all of the shorter length bit strings, this input FIFO would be emptied at the same time as the output FIFO is filled. First, leaf nodes are processed until the input bit strings are empty or until the output FIFOs are full. Then all interior nodes are processed, level by level of the binary tree, thereby filling up output FIFOs that are inputs to the next level of the tree. This processing continues until the root node of the binary tree is processed, that is, the data is pushed through.

B. Examples of Dataflow Architectures

Figure 6:
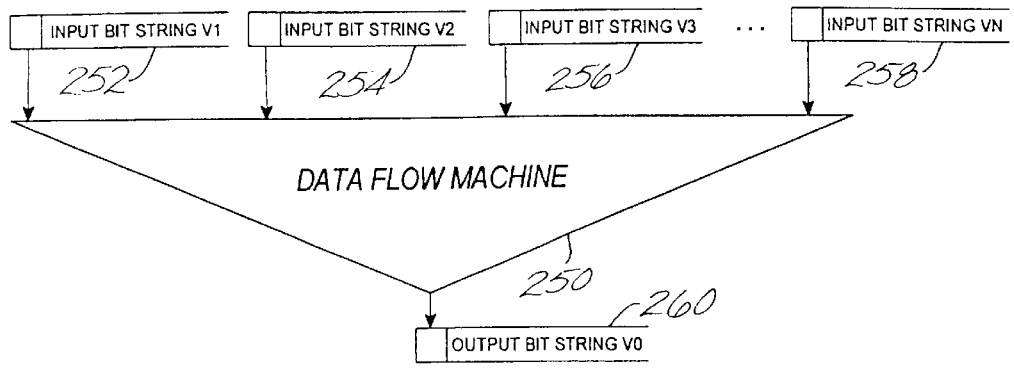
FIG. 6 is a diagram of a dataflow machine.

FIG. 6 is a diagram of a dataflow machine according to the present dataflow architecture model. The dataflow machine 250 takes a plurality of input bit strings V1 252, V2 254, V3 256, ... VN 258, and produces an output bit string V0 260. The input can be from any source that produces compressed impulses from either converted raw bit strings or encoded bit strings. The dataflow machine produces the output bit string without having to repetitively combine pairs of input bit strings as in prior methods. In the preferred embodiment, any number "N" of input bit strings are input to the dataflow machine and a resultant output bit string is produced.

Figure 7:
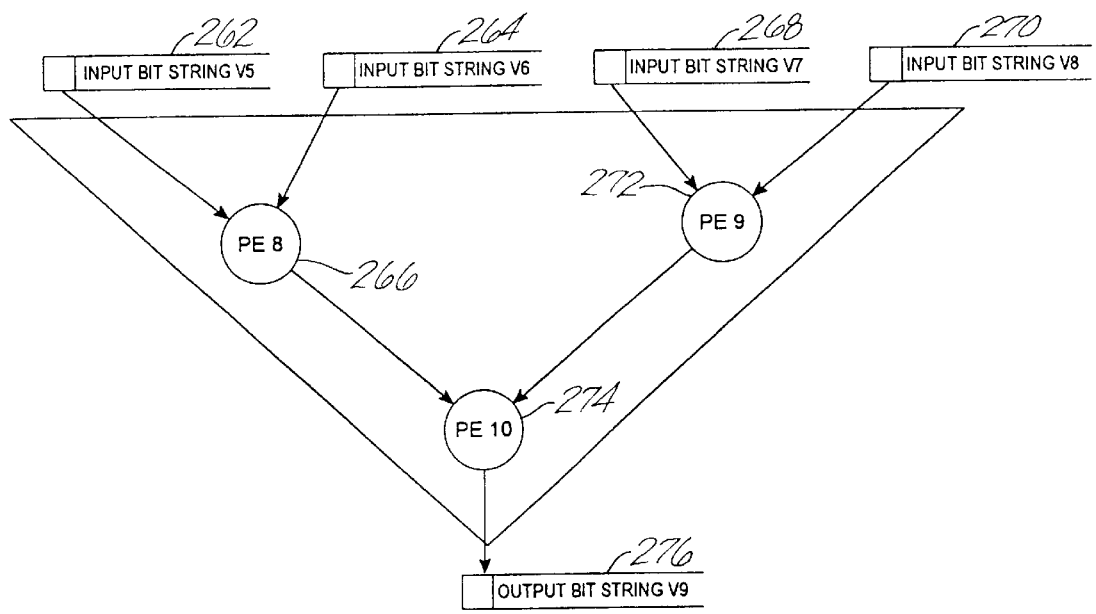
FIG. 7 is a diagram of a sample dataflow machine with four input bit strings.

FIG. 7 is a diagram of a sample dataflow machine with four input bit strings. In this simple example, input bit strings V5 262 and V6 264 are input to PE 8 266, and input bit strings V7 268 and V8 270 are input to PE 9 272. The outputs of PE 8 266 and PE 9 272 are inputs to PE 10 274. PE 10 274 produces a resultant output bit string V9 276. The Processing Elements PE 8 266 and PE 9 272 are leaf nodes and PE 10 274 is the root node. This example shows a binary tree having four input bit strings, two levels, and three Processing Elements. Note that for every N input bit strings, there are N−1 nodes and the binary tree has i levels, where 2**i−1 equals the number of nodes in the tree.

Figure 8:
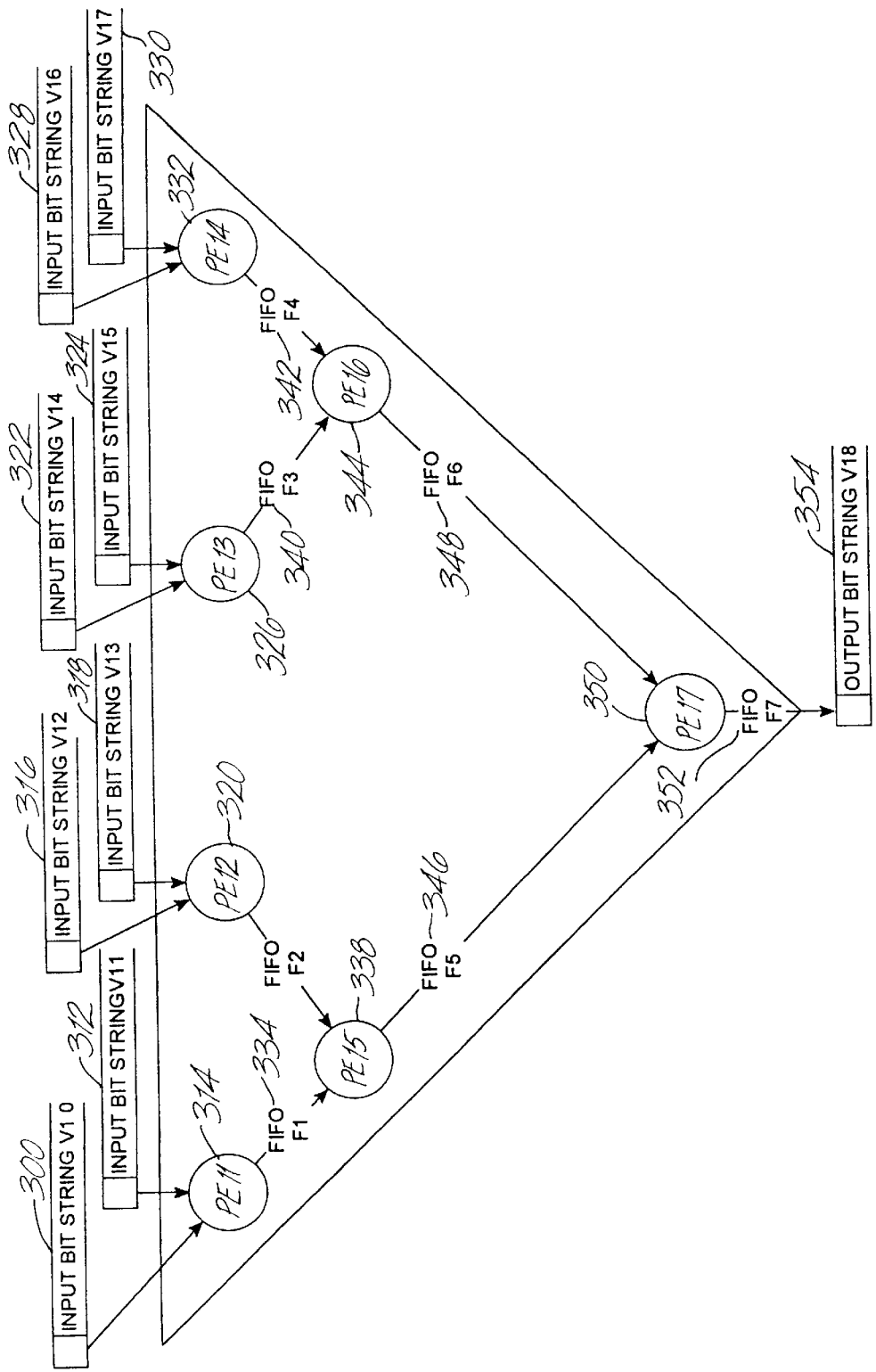
FIG. 8 is a diagram of a sample dataflow machine with eight input bit strings.

FIG. 8 is a diagram of a sample dataflow machine with eight input bit strings. In this example, input bit strings V10 300 and V11 312 are input to PE 11 314, input bit strings V12 316 and V13 318 are input to PE 12 320, input bit strings V14 322 and V15 324 are input to PE 13 326, and input bit strings V16 328 and V17 330 are input to PE 14 332. Processing Elements PE 11 314, PE 12 320, PE 13 326, and PE 14 332 are leaf nodes of the binary tree. The output of PE 11 314 is stored in a FIFO F1 334 and the output of PE 12 320 are stored in a FIFO F2 336. The data in FIFO F1 334 and FIFO F2 336 are input to PE 15 338. Similarly, the output of PE 13 326 is stored in a FIFO F3 340 and the output of PE 14 332 is stored in a FIFO F4 342. The data in FIFO F3 340 and FIFO F4 342 are input to PE 16 344. PE 15 338 and PE 16 344 are intermediate or interior nodes of the binary tree. The output data of PE 15 338 is stored in FIFO F5 346 and the output data of PE 16 344 is stored in FIFO F6 348. These FIFOs feed PE 17 350. PE 17 is the root node of the binary tree. PE 17 350 outputs data to FIFO F7 352. Data is taken from FIFO F7 352 to generate the output bit string V18 354.

Figure 9:
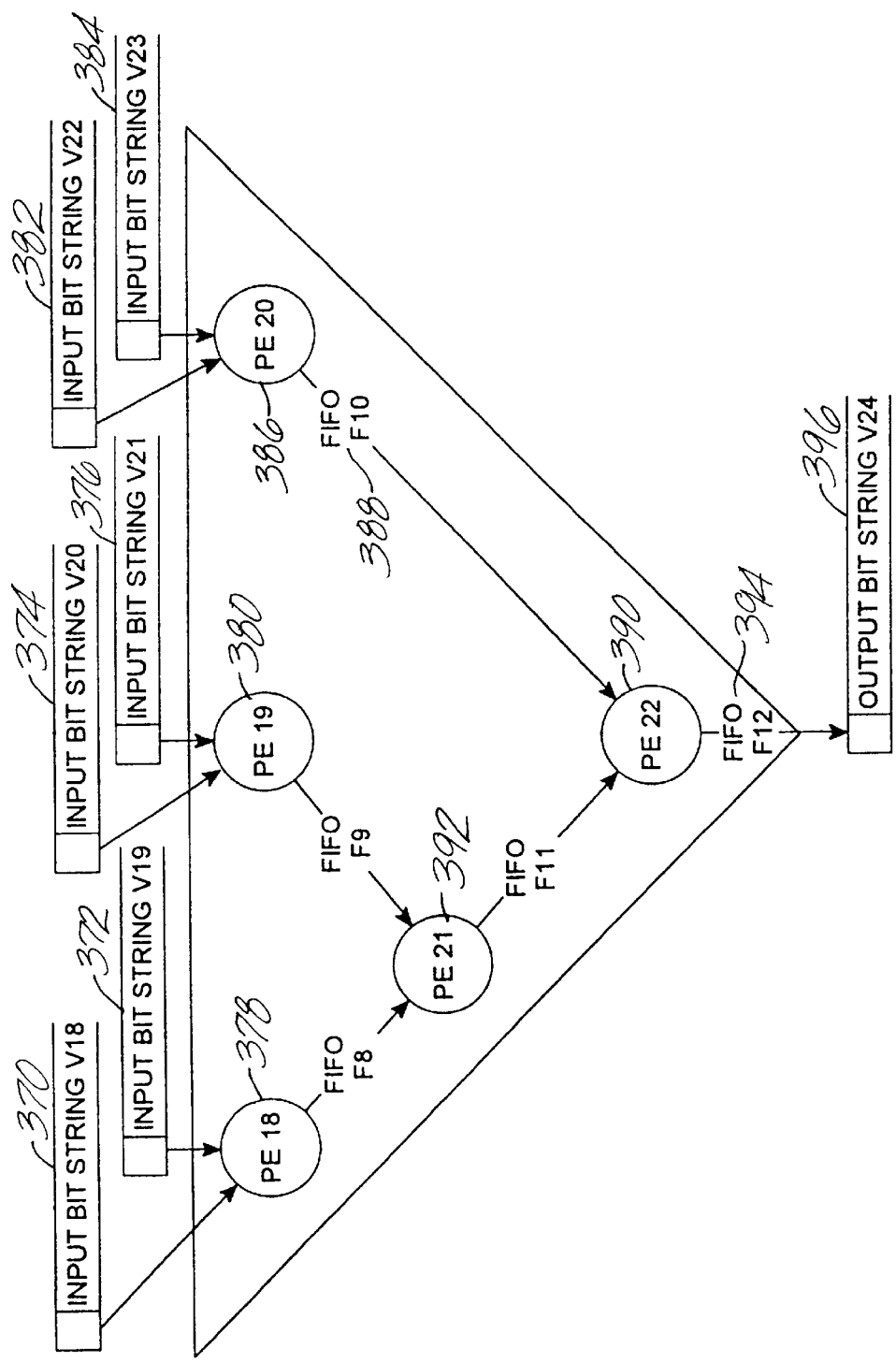
FIG. 9 is a diagram of a sample dataflow machine with six input bit strings.

FIG. 9 is a diagram of a sample dataflow machine with six input bit strings. In this example, the number of input bit strings is not a power of two. Note how input bit strings V18 370 and V19 372, and V20 374 and V21 376, are connected to PE 18 378 and PE 19 380, respectively, as in previous examples. Input bit strings V22 382 and V23 384 are connected to PE 20 386. The output of PE 20 is coupled through FIFO F10 388 to PE 22 390. Data from PE 18 378 and PE 19 380 flow through PE 21 392 as shown and into PE 22 390. The output of PE 22 390 is stored in FIFO F12 394 before generation as output bit string V24 396.

C. Advantages of the Dataflow Architecture and Design Considerations

The use of the dataflow architecture model for processing many input bit vectors to produce a single output bit vector provides a number of significant advantages.

Firstly, it reduces bit vector generation processing, resulting in a faster operation. Previous systems generated temporary bit strings to represent intermediate processing results. Hence, repeated allocation and subsequent deallocation of storage for these temporary bit strings was required. In contrast, the present invention buffers intermediate results in pre-defined memory-resident FIFOs so intermediate results never materialize as temporary bit strings.

The dataflow architecture model only creates temporary bit strings when the number of input bit strings exceeds a pre-defined maximum number of inputs (e.g., 512 in the preferred embodiment for a binary tree with 256 leaf nodes). As each group of 512 input bit strings is processed through the dataflow machine, a new temporary bit string is created to hold the intermediate result. The dataflow machine continues operating in this manner until all input bit strings have been processed. It then passes the collection of temporary intermediate bit string results through the dataflow machine again to produce a resultant output bit string. Hence, the dataflow model produces considerably fewer temporary bit strings, so storage requirements are minimized and allocation/deallocation overhead is minimized.

In prior systems a sort buffer of 1 megabytes (MB) of memory was allocated to perform the bit string operations involving many input bit strings. By using the dataflow machine to handle the majority of these operations with many input bit strings, the size of the sort buffer needed for remaining operations can be reduced to 512 kilobytes (KB) of memory providing 512 KB of memory for the FIFOs with no adverse performance effects.

The present invention nearly eliminates disk input/output (I/O) operations required for storing temporary intermediate bit strings. When the currently allocated disk storage cannot satisfy a request for storage of a temporary intermediate bit string, an external storage device file is extended to provide the storage. This extension results in performance of disk I/O operations. Since fewer temporary intermediate bit strings are needed, fewer disk I/O operations are performed.

Overall query performance better than a highly optimized general purpose sorting algorithm (such as shellsort) is made possible in the present invention by exploiting an essential property of bit strings. Most general purpose sorting methods use the following general strategy in two phases: 1) make a first pass through the file to be sorted, breaking it up into blocks about the size of internal memory resources (the scan phase), and then sort these blocks in memory and write them back to disk; 2) merge the sorted blocks together by making several more passes through the file, creating successively larger sorted blocks (the merge phase).

A similar strategy was used in prior systems. First, the input bit strings were scanned and their contents were stored as integers in a sort buffer. The sort buffer was 1 MB in size so that many input bit strings could be scanned before the sort buffer was filled up. When the sort buffer filled up, the integers were sorted using a shellsort algorithm. From the resulting sorted list, an intermediate bit string result was generated. These steps are equivalent to the scan phase mentioned above. After the scan phase was complete for all input bit strings, the merge phase was performed on the intermediate bit string results by performing pair-wise boolean operations until a final result bit string was produced.

With a sufficiently large sort buffer (1 MB in our example), this scan and merge method minimized the number of generated intermediate bit strings. It was not possible to further enhance performance by enlarging the sort buffer beyond 1 MB since the algorithmic complexity of the shellsort algorithm is O(n log n), wherein n is the number of elements in the sort buffer. As n increased for buffer sizes beyond 1 MB, the shellsort algorithm takes proportionately longer to execute (n log n), offsetting the savings obtained by merging fewer intermediate bit strings, and ultimately limiting performance. If the shellsort algorithm did not slow down as n increased, then an arbitrarily large sort buffer could be used and no intermediate bit strings would need to be produced. That is, the merge time could be traded off for the scan time. The optimal performance was obtained by determining the best balance between the sort buffer size (the scan phase) and the cost of merging intermediate bit string results (the merge phase).

However, an essential property of bit strings is that they are intrinsically sorted (e.g., bit 1 precedes bit 5, bit 5 precedes bit 8, etc.). Thus, sorting of input values is unnecessary in the scan phase and can be eliminated altogether if a highly efficient merge phase method, operating better than O(n log n), can be devised.

The present invention uses a scan and merge technique in a dataflow architecture. The dataflow machine scans the input bit strings and orchestrates the merging of the intrinsically sorted bit strings, by using FIFOs to buffer intermediate bit string results, thereby avoiding the cost of performing an explicit sort operation. This method results in measurably better performance than the prior method (i.e., better than O(n log n)) for a given amount of memory (sort buffer v. FIFO).

The preferred embodiment of the present invention uses a "minima" method as disclosed in U.S. Pat. No. 5,036,457 to Glaser et al., the entire disclosure of which is incorporated herein by reference. The minima method passes the shortest of the two impulses through a Processing Element (PE). With this method, the number of cycles each PE performs is equal to the sum of the number of impulses in the A and B input bit strings. The path length of the bit strings processed through the dataflow machine is minimized by using the binary tree configuration. The path length of a bit string through the dataflow machine is equal to the number of PEs it visits. Since a dataflow machine consists of a binary tree of PE nodes, the path length from any leaf PE to the root PE is always a fixed number. For example, a binary tree with 16 leaf nodes has 5 levels and a path length of 5.

The behavior of a linear array of PE nodes successively combined pairwise is not as predictable as the present binary tree data structure, especially when bit strings with the most impulses traveled farthest from the root, that is, have the longest path length. As with the dataflow machine, the number of cycles for each PE is calculated the same, however, with a linear array one of the two inputs to a PE is output from the predecessor PE. The number of cycles of the successor PE is effectively compounded by the number of cycles of the predecessor PE. Sorting of inputs from fewest impulses to most impulses helps mitigate this computational problem, but proves to be minimally beneficial. Performance for the linear approach peeked at a maximum of 16 nodes with 16 inputs, whereas the dataflow machine of the present invention processes at least 512 input bit strings at a time.

Overall performance gains are also obtained in the present invention by utilizing inherent properties of the dataflow architecture. Since the preferred embodiment of the dataflow machine uses the minima method, it is certain that the output FIFO will become full before input FIFOs are emptied. Therefore, a test for an empty input FIFO is not needed.

When one of the inputs to a PE reaches an "end of input" (EOV) state (meaning all input bit units have been processed), the other input is simply passed through the PE unmodified as output bit units. The present invention takes advantage of this property by pre-loading the output path C with the input data to be passed through and bypassing any further substantive processing by the PE. This optimization is referred to as "shunting" the input. The dataflow machine continues to pass the other input bit units through in successive operating cycles of the PE by forging a special processing path through the PE's program to avoid unnecessary processing steps.

The PEs in the preferred embodiment of the present invention process only the boolean "OR" operation on input data. Due to this fact, certain conditions can be relied on in composing the output C. The run and gender of C is equal to the run and gender of the shorter input operand unless the other operand is of gender one, in which case the run bit is one and the gender bit is one. This simplifies the composition of the result C.

Since only the boolean "OR" operation is performed, the bit units passing through the PEs are usually impulses. Attempting to combine bit units that are usually impulses by using Canonical Processor 25 of FIG. 1 wastes PE cycles since no combining can be accomplished or is necessary, and thus acts as a performance bottleneck in the dataflow machine. To improve performance, combining of bit units is deferred until the FIFO of the root PE is read to generate the output bit string.

V. Processing Architecture

The structure of a computer program for use in the system of FIG. 1 and a process created by the computer program for performing a boolean "OR" operation on a plurality of bit strings in accordance with the present invention is shown in the diagrams of FIGS. 10–26.

Generally, dataflow processing proceeds as follows. After data structures are initialized, all leaf nodes of the binary tree are processed. This processing uses a boolean flag called an A or B flag (AoB). The AoB flag is toggled back and forth to indicate whether the current input bit string being connected to a PE is an A-side input or a B-side input. The processing of leaf nodes includes creation of a PE for every two input bit strings. In a software implementation, creation of a PE is accomplished by instantiating the data structure for the PE. Next, processing of leaf nodes includes attaching an input bit string to a PE by setting the identifier of an input bit string to the A-side of the current PE if not AoB, or to the B-side of the current PE if AoB. The AoB flag is then toggled after each input attachment. This processing is performed for all leaf nodes.

If there is an odd number of input bit strings, then after the last input bit string is processed the A-side VID of the last leaf PE is detached from this PE if AoB is true. The remainder of the nodes of the binary tree are then connected. Connection is made by linking each output FIFO as the input FIFO of an interior PE to form a binary tree as in FIG. 5B. Each of the PEs are processed by reading the A and B input bit units, performing the boolean "OR" operation on the input data, and storing output data in a C bit unit queue until the C bit unit queue is full or until the PE is in an end of input state. A resultant bit string is generated by reading the C bit unit queue of the root PE of the binary tree and writing an output bit string. A status of "done" is returned to a calling program when the end of output state has been reached for the root PE.

Figure 10:
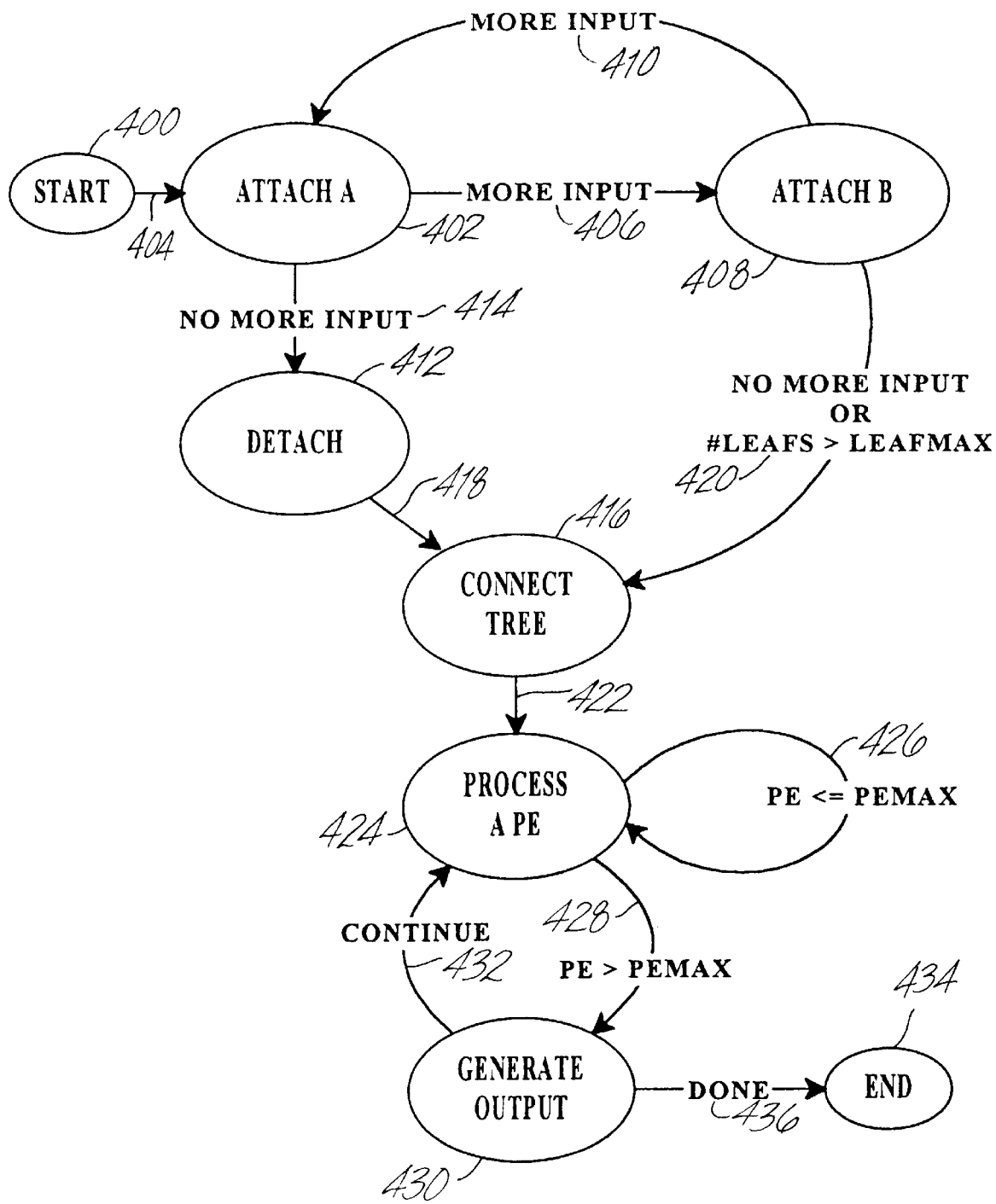
FIG. 10 is a state transition diagram of the present invention.

FIG. 10 is a state transition diagram of the present invention. After Start state 400, the dataflow machine transitions to the Attach A state 402 via arc 404. While in the Attach A state, the dataflow machine attaches an "A" side input to a PE. If more input bit strings are available, More Input arc 406 transitions the dataflow machine to the Attach B state 408. While in the Attach B state, the dataflow machine attaches a "B" side input to a PE. If more input bit strings are still available, More Inputs arc 410 is followed back to the Attach A state 402. If during the Attach A state 402 no more input bit strings are available, then the dataflow machine transitions to the Detach state 412 via No More input arc 414. The dataflow machine then detaches the odd-numbered input bit string from the PE to which it was attached. Further processing continues with the Connect Tree state 416 via arc 418. If during the Attach B state 408 no more input bit strings are available or the number of leafs of the binary tree is greater than a predetermined maximum number, then the dataflow machine transitions to the Connect Tree state 416 via No More Input Or #Leafs>Leafmax arc 420.

During the Connect Tree state 416, the dataflow machine connects all PEs into a binary tree configuration. Processing continues via arc 422 with the Process A PE state 424. While in this state, the dataflow machine processes a selected PE. If the number of PEs processed is less than a predetermined maximum number of PEs, then PE<=PEMAX arc 426 is followed back to the Process A PE state 424. When all PEs of the binary tree have been processed, then PE>PEMAX arc 428 is followed to the Generate Output state 430. At the Generate Output state 430, the dataflow machine generates the output bit string from the binary tree of PEs. If the end of output has not been reached for the root PE, then the dataflow machine transitions back to the Process A PE state 424 via arc Continue 432. Otherwise, the dataflow machine transitions to the End state 434 via arc 436.

FIGS. 11A–11C are diagrams of data structures used during processing of the present invention. FIG. 11A shows the components of a Processing Element (PE) 444. The PE is the main data structure used by the present invention. Note that the PE can be implemented in either computer hardware or software. When implemented as computer hardware, no data structure or pointers are used. When implemented as computer software, the PE is manifested through the use of data structures and pointers. The following is a discussion of the PE. as implemented in computer software. A PE 444 is created or instantiated for each logical PE in the dataflow architecture model for a given set of input bit strings. The PE 444 includes an AVID 446 vector identifier (ID), a BVID 448 vector ID, a pointer AFIFO 450 to a first bit unit queue, a pointer BFIFO 452 to a second bit unit queue, bit units A 454 and B 456, a bit unit queue C 456, and an End Of Vector (EOV) counter 458. The EOV counter indicates when an end of input state has been reached for a bit unit. The AVID 456 and BVID 458 fields identify and provide a processing handle for the inputs A 202 and B 204, respectively, of the PE model as shown in FIG. 5A. The A and B inputs are either bit units for leaf nodes or bit unit queues for interior or intermediate nodes. Bit units and bit unit queues are described below in FIG. 11B and FIG. 11C, respectively. If the bit strings input to a particular PE are input bit strings to the binary tree (i.e., this PE is a leaf node), then bit units A 454 and B 456 denote the inputs to the PE. If the bit strings input to a particular PE are outputs from another PE (i.e., this PE is not a leaf node), then bit unit queues referenced by AFIFO 450 and BFIFO 452 denote the inputs to the PE. The A-side and B-side bit unit queues hold the input data that was generated (as output) by a PE "higher" in the binary tree. The bit unit queue C 458 denotes the output path C 206 of the PE model as shown in FIG. 5A. The EOV value 460 is used to denote the end of input data in the input bit strings or input FIFOs for the PE.

The elements of a bit unit 462 are shown in FIG. 11B. The V boolean flag 464 indicates an end of input state. If V 464 is on, then the bit unit stream is in an end of input state, else the bit unit is not in an end of input state. When in an end of input state, no more input data is available for the PE. The R boolean flag 466 indicates whether the current bit unit is a run or an impulse. If R 466 is on, then the bit unit is a run, else the bit unit is an impulse. The G boolean flag 468 indicates gender of the current bit unit. If G 468 is on, then the gender of the bit unit is one, else the gender of the bit unit is zero. The Length field (LEN) 470 specifies the length of the bit unit as either a 32-bit or a 64-bit unsigned integer.

The components of a bit unit queue 472 are as shown in FIG. 11C. When implemented in software, the Circular Buffer component 474 is a list of bit units accessed in a First-In-First-Out (FIFO) manner. The number of bit units in the FIFO is set to a predetermined maximum value (that is, the size of the FIFO is known). The Head field 476 is an index to the head element of the FIFO. The Tail field 478 is an index to the tail element of the FIFO. The Count field 480 is the number of bit unit elements currently in the FIFO.

While in the Connect Tree state 416 of FIG. 10, the dataflow machine initializes the PE data structures as follows. When each PE is assigned to a node in the binary tree, the indices to AFIFO 450 and BFIFO 452 are set to null, A 454, B 456 and C 458 are empty, and EOV 460 is set to false.

Figure 12:
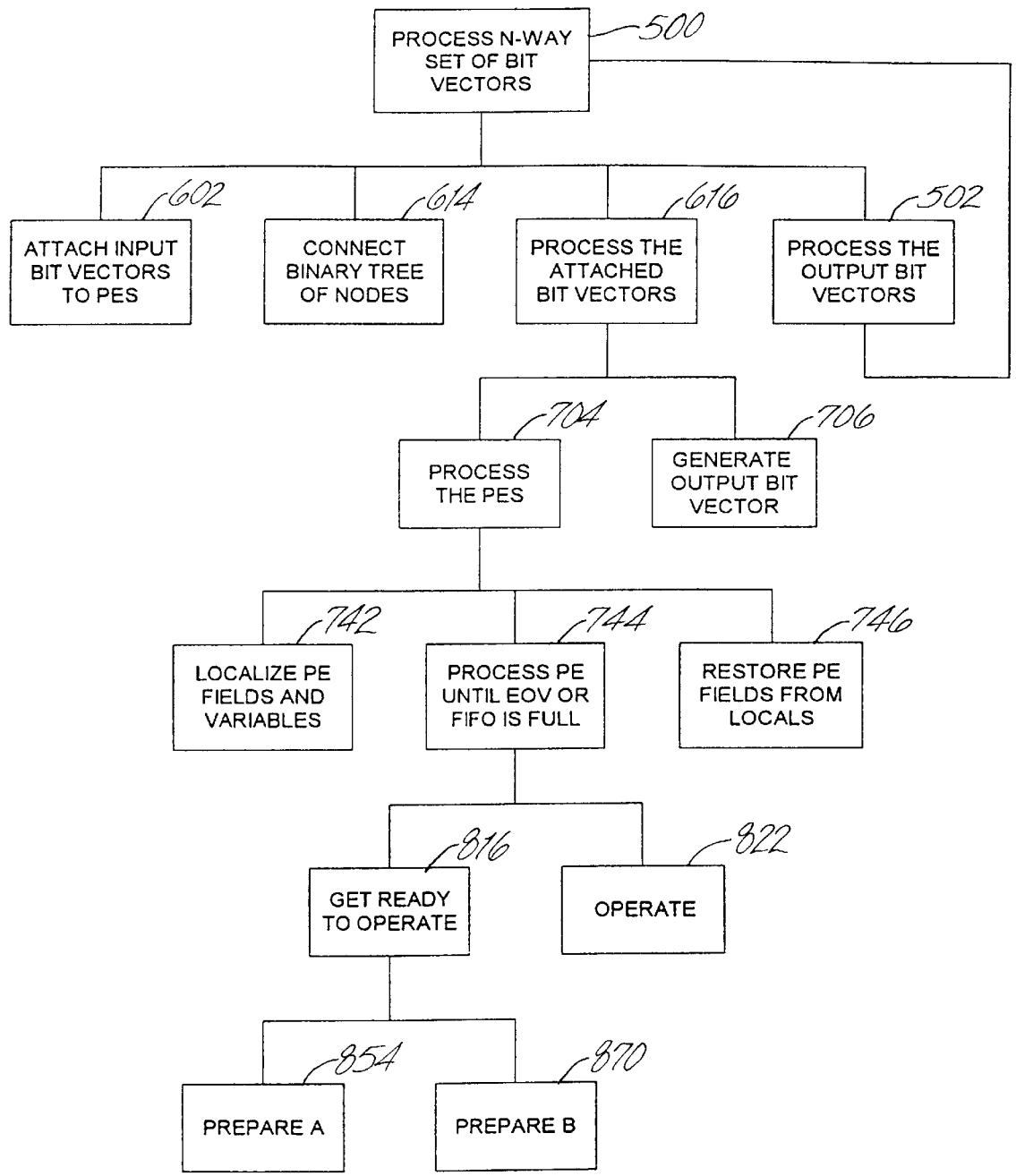
FIG. 12 is a call levels chart of the software design of the present invention.

FIG. 12 is a call levels chart of the software design of the present invention. The software embodiment of the present invention is implemented as a "C" language program executed by processor 2 of FIG. 1, although other programming languages may also be used. In the preferred embodiment, this design would be implemented in computer hardware to increase overall system performance. FIG. 12 shows the main operations of this program. The dataflow machine is created and processing is accomplished by calling the function N-Way Processing Of Bit Vectors 500. In this embodiment, bit strings are represented as bit vectors. Recall that a bit vector is an encoded form of a series of bit strings. This function calls other processes as shown. Each of the processes shown in FIG. 12 is discussed below in FIGS. 13–26. The process Process The Output Vectors 502 recursively calls the function N-Way Processing Of Bit Vectors 500.

Figure 13:
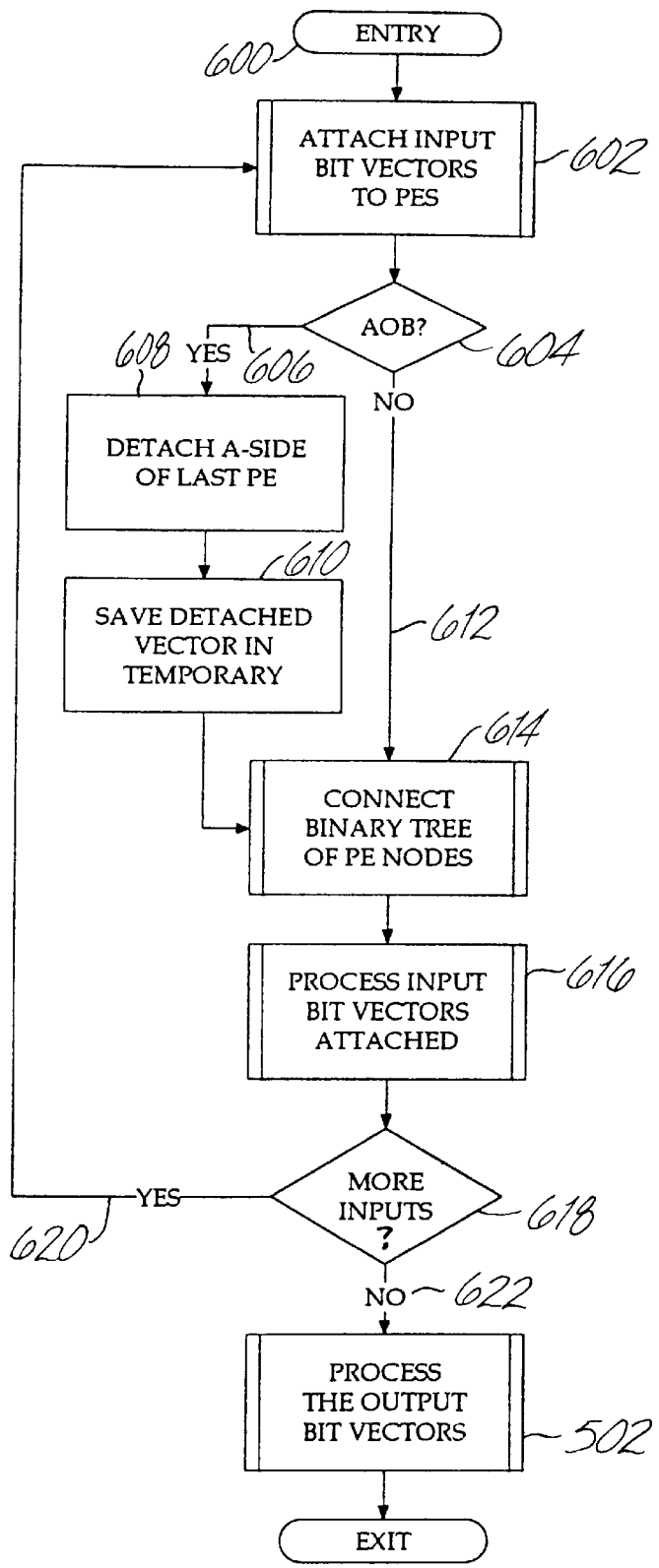
FIG. 13 is a flow chart of the processing steps for the N-Way Processing Of Bit Strings function.

FIG. 13 is a flow chart of the processing steps for the N-Way Processing Of Bit Vectors function. This function will perform a boolean "OR" operation on a given set of input bit vectors and return a resultant output bit vector. After function Entry 600, the process Attach Input Bit Vectors To PEs 602 is called to connect a set of input bit vectors to the Processing Elements (PEs). This process is described in further detail below with respect to FIG. 14. The number of input bit vectors handled by one dataflow machine is implementation dependent. In the preferred embodiment, the number of input bit vectors handled by a dataflow machine is 512, although other limits may also be set depending on the processing power and memory capabilities of processor 2 of FIG. 1. The present invention uses a boolean flag called the A or B flag (AoB) to keep track of which input is to be connected to the current PE (i.e., either the A-side or the B-side). The AoB flag is toggled back and forth as processing proceeds. After all input bit vectors are attached to the leaf PEs, if the AoB flag is on (true), then there were an odd number of input bit vectors for the dataflow machine. The extra input bit vector must be handled differently than the other input bit vectors. Hence, at Test Step 604, the A or B flag (AoB) is checked to determine if it is true, which indicates that an input bit vector is the sole input for the last PE. If the AoB flag is set to true, Yes path 606 is taken to Step 608, where the A-side input bit vector is detached from the last PE, and then to Step 610, where the detached input bit vector is saved in a temporary data structure for future processing.

If the AoB flag is not set, then there are an even number of input bit vectors for this dataflow machine. Accordingly, No path 612 is taken to Step 614. At this step, the binary tree for the dataflow machine is connected by linking all PE nodes together in a binary tree form. This process is described in further detail below with respect to FIG. 15. Next, at Step 616, the attached input bit vectors are processed by reading input data from the input bit vectors and "pushing" the data through the dataflow machine. This process is described in further detail with respect to FIG. 16. If more inputs exist at Test Step 618 as part of the current query, Yes path 620 is taken back to Step 602, where more input bit vectors are attached to the reinitialized set of PEs, thereby handling queries requiring more than the predefined maximum number of input bit vectors capable of being handled by one dataflow machine. Otherwise, No path 622 is taken to Step 502, where the output vectors from the dataflow machine(s) are processed to produce a resultant output bit vector. This process is described in further detail below with respect to FIG. 26. Processing ends at Exit 626.

Figure 14:
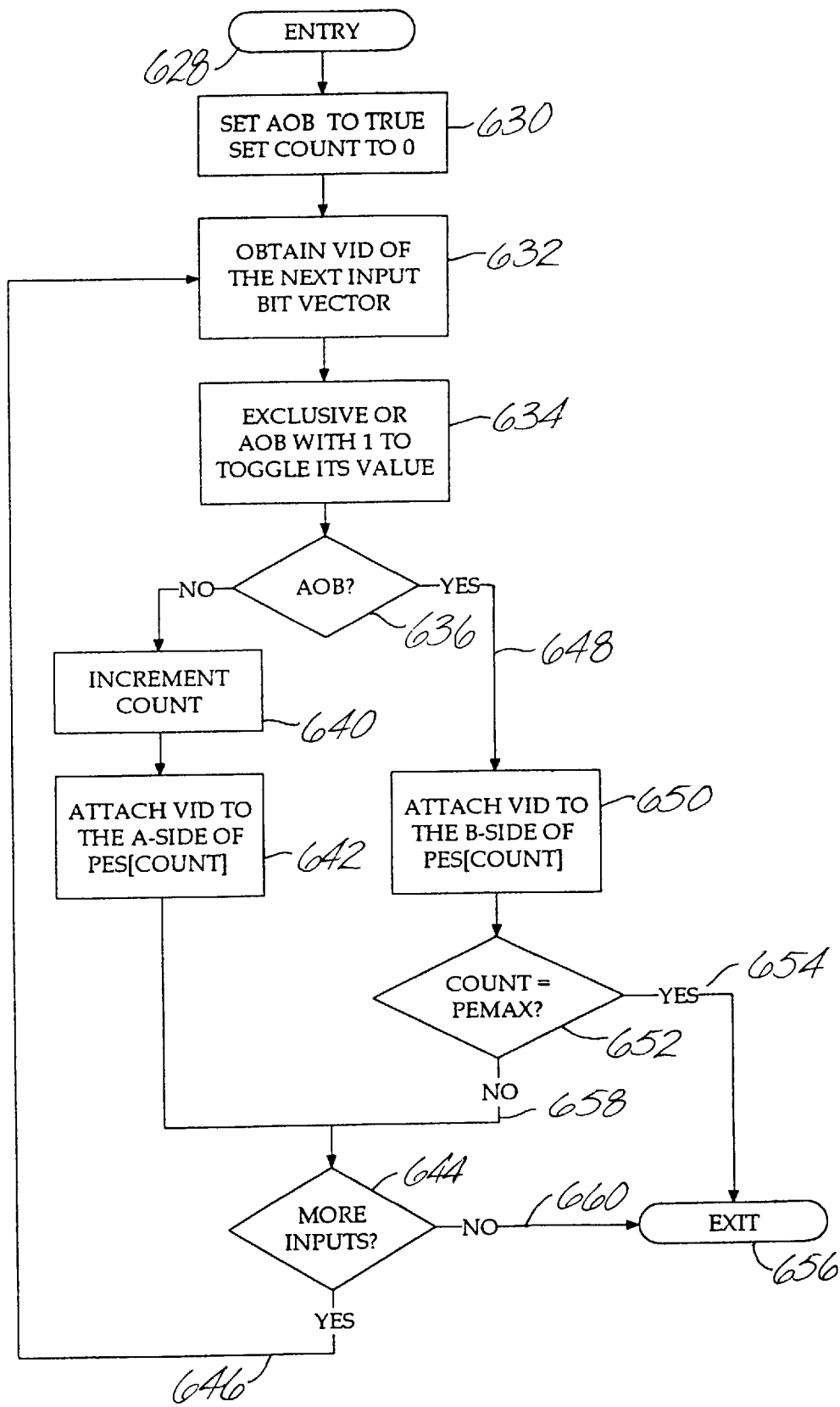
FIG. 14 is a flow chart of the processing steps for attaching input bit strings to Processing Elements.

FIG. 14 is a flow chart of the processing steps for attaching input bit vectors to PEs. After Entry 628, the AoB flag is set to true and a counter called Count is set to zero at Step 630. Count represents the number of leaf PEs in this dataflow machine. The AoB flag indicates the A-side or the B-side of the PE. At Step 632, the Vector ID (VID) of the next input bit vector (initially the first input bit vector) is obtained from the set of current input data. At Step 634, an "Exclusive-OR" (XOR) operation is performed on the AoB flag with a one as the other input to toggle the value of the AoB flag. If the AoB flag is then false (zero) at Test Step 636, No path 638 is taken to Step 640. At this step, the Count is incremented to advance to an additional PE in the dataflow machine. Next, at Step 642 the VID of the current input bit vector being processed is attached to the A-side of the current PE (as selected by the Count variable in an array of PEs), by setting the VID of the A-side input of this PE (AVID 446) to the VID of the current input bit vector. Processing continues with Test Step 644. If more input bit vectors are still to be processed, Yes path 646 is taken back to Step 632 as shown to get the VID of the next input bit vector.

If the AoB flag is true at Test Step 636, Yes path 648 is taken to Step 650. This means that a B-side input bit vector must now be attached. At Step 650 the VID of the current input bit vector being processed is attached to the B-side of the current PE (as selected by the Count variable in an array of PEs), by setting the VID of the B-side input of this PE (BVID 448) to the VID of the current input bit vector. Two input bit vectors are now attached to the current PE. At Test Step 652 a check is made to determine if the maximum number of leaf PEs has been reached. If the maximum has been reached, then Yes path 654 is taken and this process is exited at Exit 656. The AoB flag and Count are returned to the calling process. Count holds the number of leaf nodes in the binary tree structure. If the maximum number of leaf PEs has not been reached, then No path 658 is taken to Test Step 644 to determine if more input bit vectors need to be processed. If there are no more input bit vectors to process, No path 660 is taken to Exit 656. Otherwise, processing of additional input bit vectors continues with Step 632.

Figure 15:
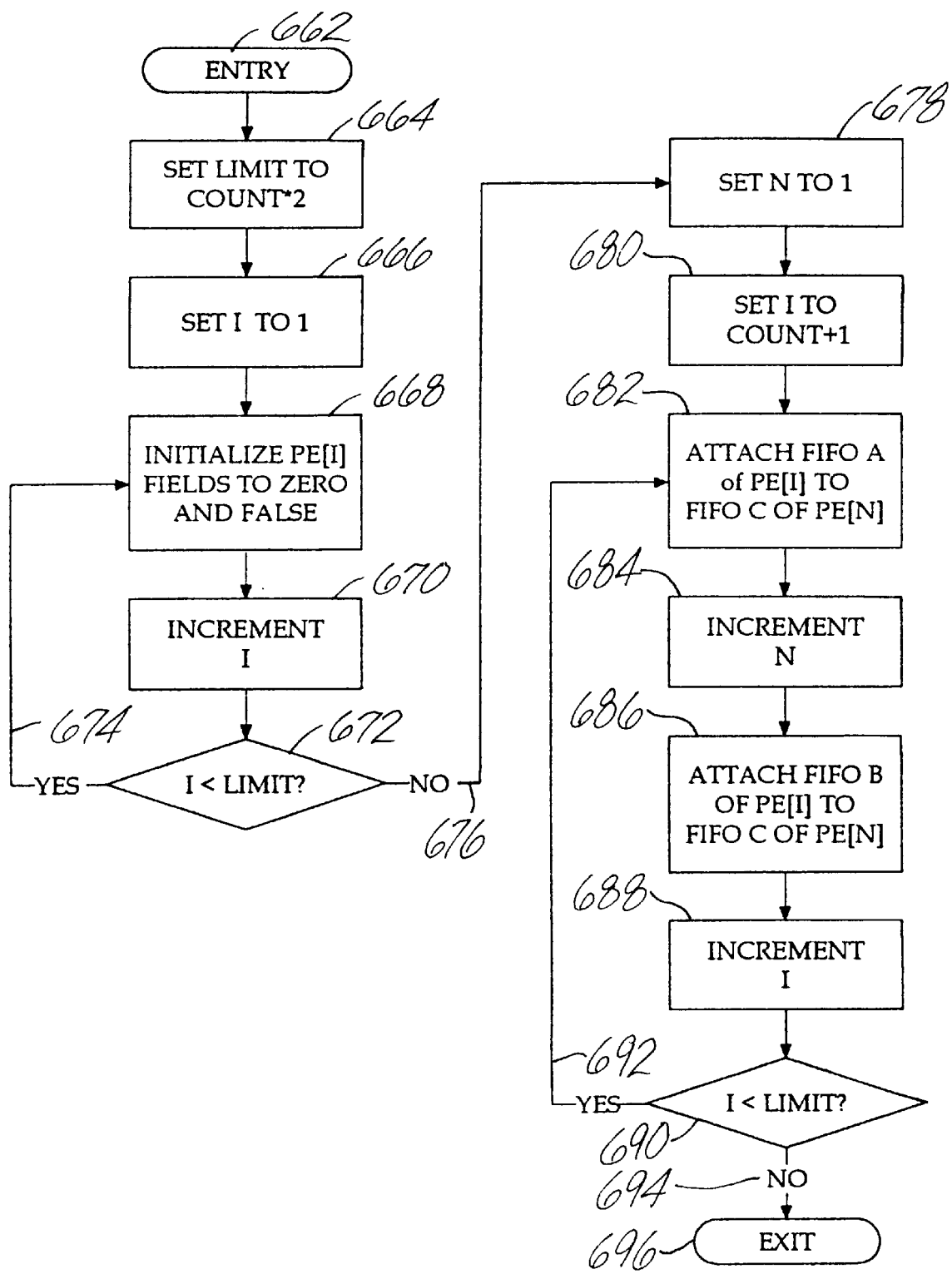
FIG. 15 is a flow chart of the processing steps for connecting a binary tree of Processing Element nodes.

FIG. 15 is a flow chart of the processing steps for connecting a binary tree of PE nodes. Upon Entry 662, a Limit variable is set to twice the number of PEs as stored in the Count variable during Step 664. The Limit is one plus the total number of PEs in the binary tree. The PE data structures representing the binary tree for the dataflow machine must first be initialized. At Step 666, a loop counter I is set to one. Next, at Step 668, the fields of the current PE data structure selected by I are initialized by setting them to zero and false, as required (except for the AVID and BVID fields, the AVID and BVID fields for leaf nodes were set in the Attach Input Bit Vectors To PEs process described in FIG. 14). The loop counter I is incremented at Step 670. At Test Step 672, if I is less than the Limit, then Yes path 674 is taken to Step 668 to initialize the next PE. Otherwise, if all PEs have been initialized, No path 676 is taken to Step 678 for further initialization of interior nodes of the binary tree. At this step, a working variable N is set to one, indicating the first PE. At Step 680, the loop counter I is set to the Count plus one. The loop counter I now denotes the first interior (i.e., non-leaf) node of the binary tree.

At Step 682, the A-side input of the first interior node is set to the output of the first leaf node. This is accomplished by setting the AFIFO 450 of the PE selected by I to the C 458 field of the PE selected by N. The working variable N is then incremented at Step 684. The working variable N now references the second leaf node. Next, at Step 686, the B-side input of the first interior node is set to the output of the second leaf node. This is accomplished by setting the BFIFO 452 of the PE selected by I to the C 458 field of the PE selected by N. At Step 688 I is incremented to point to the next interior node. At Test Step 690, a check is made to determine if I is less than the Limit. That is, it is determined if all interior nodes of the binary tree have been processed. If I is less than the Limit, Yes path 692 is taken to Step 682 to connect the next interior node of the binary tree. In this manner all interior nodes are connected to form the binary tree representing the dataflow machine. When the root node of the tree has been initialized, No path 694 is taken to Exit 696.

Figure 16:
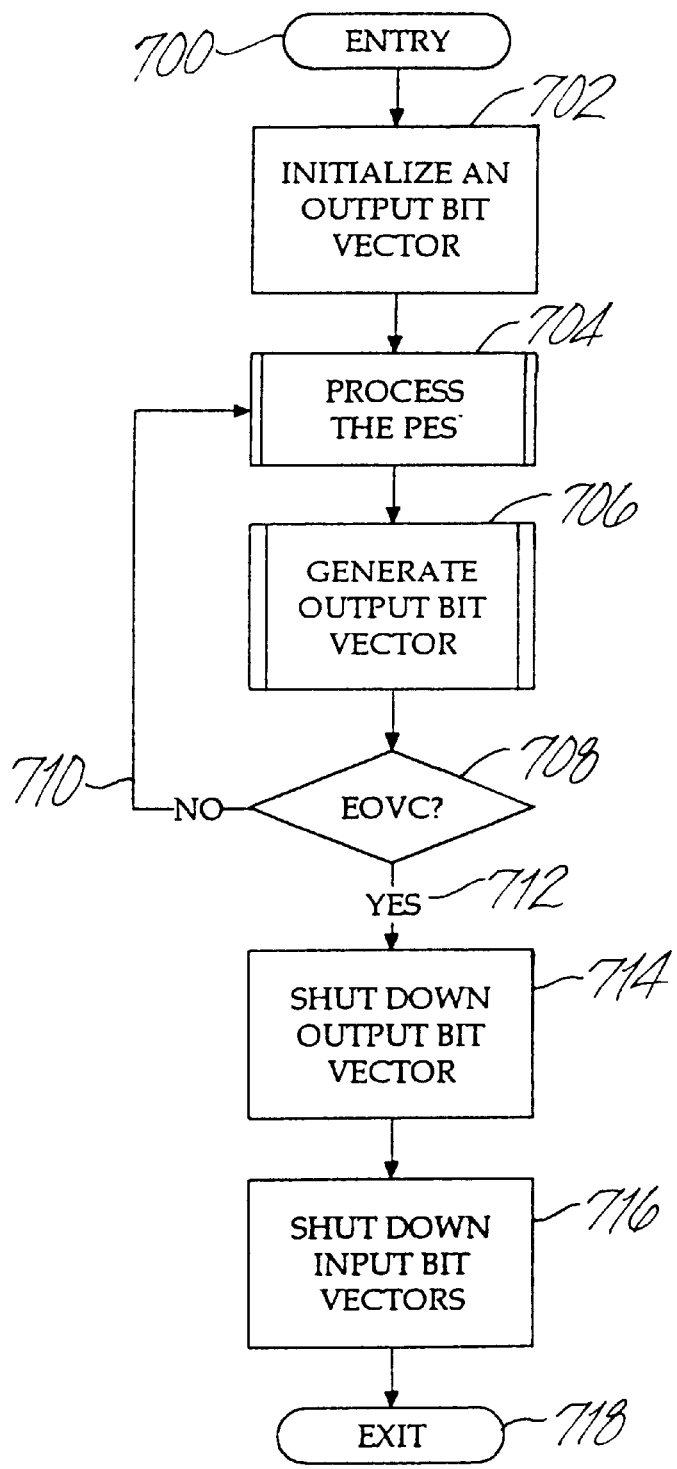
FIG. 16 is a flow chart of the steps for processing the attached set of input bit strings.

FIG. 16 is a flow chart of the steps for processing the attached set of input bit vectors. After Entry 700, an output bit vector is initialized at Step 702. The output bit vector stores the output data from the root node's FIFO. Next, Process The PEs 704 is called to process the bit vectors bound to the binary tree utilizing a dataflow approach. This process is described in further detail below with respect to FIG. 17. After the binary tree has been processed, the output bit vector is generated by calling the process Generate Output Bit Vector 706. This process is described in further detail below with respect to FIG. 25. At Test Step 708, if the end of the output data has not been reached, then the C FIFO 458 is not yet at an end-of-input state (EOVC) Accordingly, No path 710 is taken back to Step 704 to process more PEs. If the EOVC state has been reached, Yes path 712 is taken to Step 714. At this step, the output bit vector is shut down, meaning it is closed to further writing by the root node of the binary tree. At Step 716, the input bit vectors are shut down, preventing further input data from being processed. Processing then exits at Step 718.

Figure 17:
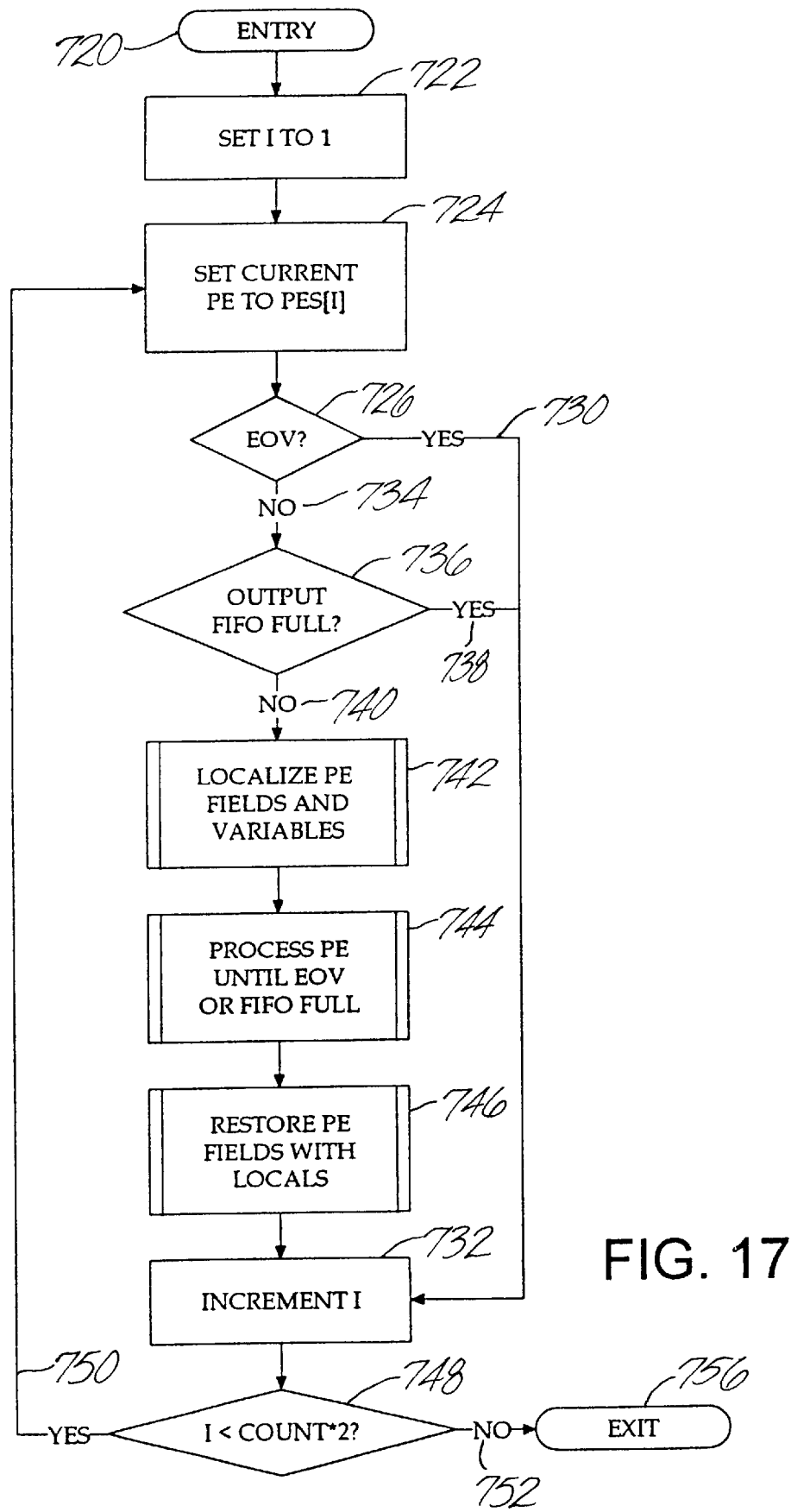
FIG. 17 is a flow chart of the steps for processing performed by the Processing Elements.

FIG. 17 is a flow chart of the steps for processing the PEs. After Entry 720, an index I is set to one at Step 722. This starts processing of PEs at the first leaf PE of the tree. At Step 724, a pointer of the current PE to be processed is set to the PE designated by I. Next, at Test Step 726, a check is made to determine if the PE is at an EOV state (i.e., there are no more inputs for this PE) by interrogating the EOV flag 420 of the PE. If this PE is at an EOV state, then Yes path 730 is taken to Step 732, where the index I is incremented. If this PE is not at an EOV state, then No path 734 is taken to Test Step 736. If the output FIFO (C 458) of the PE is full, then Yes path 738 is taken to Step 732, where the index I is incremented. Otherwise, No path 740 is taken to Step 742. At this step, the process Localize PE Fields And Variables is called to set up local data structures for the PE and other variables for subsequent processing. This process is described in further detail below with respect to FIGS. 18A–18C.

At Step 744, Process PE Until EOV Or FIFO Full is called to process the current PE until both inputs are at an EOV state or until the output FIFO is full. This process is described in further detail below with respect to FIG. 19. Next, at Step 746, the process Restore PE Fields With Locals is called to store local data back to the PE data structure for the current PE. This process is described in further detail below with respect to FIG. 24. The index I is incremented at Step 732 to point to the next PE to be processed. At Test Step 748, if I is less than twice the Count (i.e., the maximum number of PEs minus one), then Yes path 750 is taken back to Step 724 to commence processing of the next PE in the tree. Otherwise, No path 752 is taken and processing ends at Exit 756.

Figure 18C:
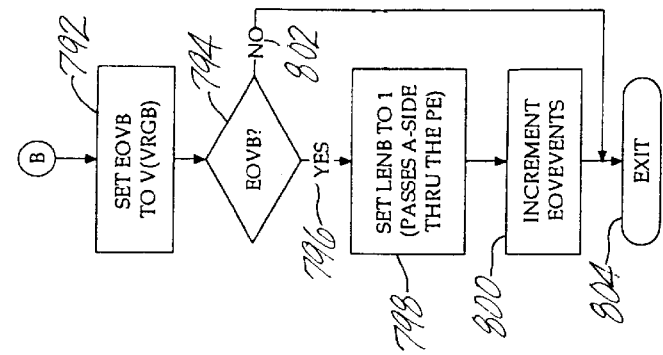
FIGS. 18A–18C are flow charts of the processing steps for localizing the fields of the Processing Element data structure and other working variables used in Processing Element processing.
Figure 18B:
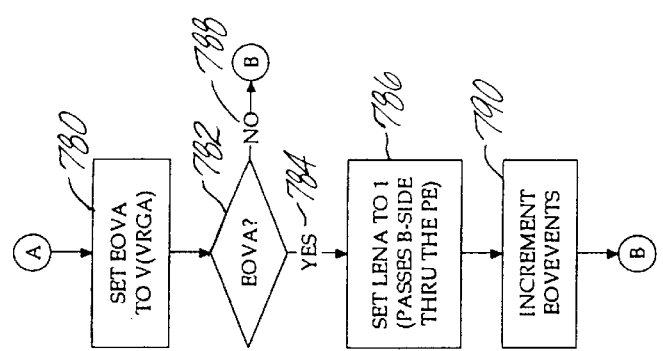
Figure 18A:
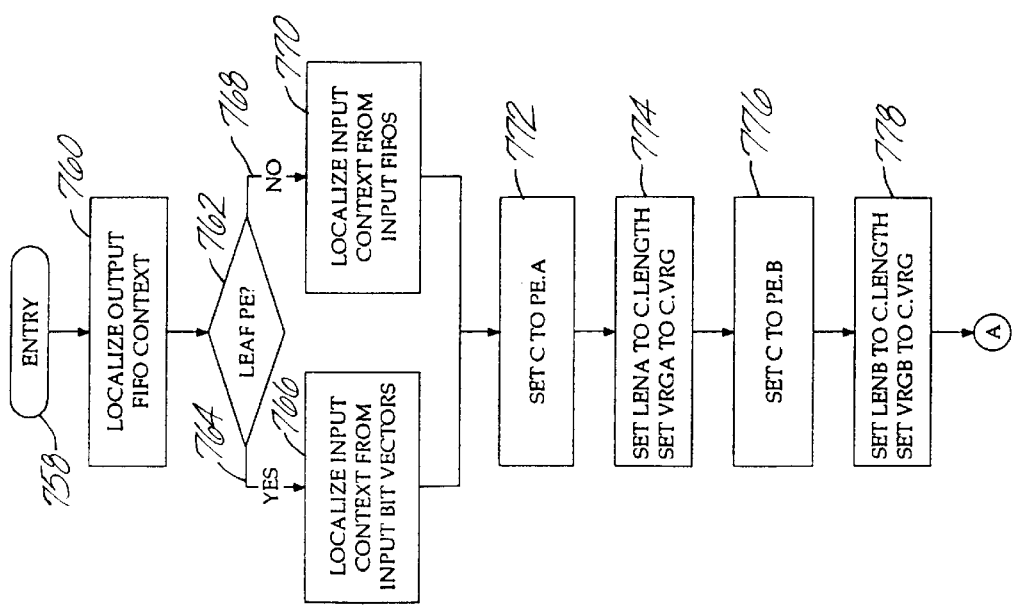

FIGS. 18A–18C are flow charts of the processing steps for localizing the fields of the PE data structure and other working variables used in PE processing. After Entry 758, the context (Head index 476, Tail index 478, and Count field 480) of the output FIFO C is localized by storing the contents of C into a local variable at Step 760. At Test Step 762, if the current PE is a leaf node, then Yes path 764 is taken to Step 766, where the context of the input vector working variables is set from the input bit vectors. Otherwise the current PE is an interior node of the tree and No path 768 is followed to Step 770. At this step the context of the input vector working variables is set from the input FIFOs.

Processing continues in either case with Step 772. The output data structure must now be initialized. At Step 772, the C FIFO is set to the A bit unit of the current PE. Next, at Step 774, local variables for A are assigned values by setting the length of A (LEN A) to the length of the C FIFO, and the V, R, and G flags of A to the V, R, and G values, respectively, stored in C. At Step 776, C is then set to the B bit unit of the current PE. Next, at Step 778, local variables for B are assigned values by setting the length of B (LEN B) to the length of the C FIFO, and the V, R, and G flags of B to the V, R, and G values, respectively, stored in C. Processing continues via connector A to FIG. 18B.

At Step 780, an end of input (EOV) variable for A is set to the V flag of A by extracting the V bit. If EOVA is set at Test Step 782, then Yes path 784 is taken to Step 786. The length of A (LEN A) is set to one. This causes the B-side of the input data to be passed through the PE to the output FIFO. Otherwise, No path 788 is taken to Step 792 on FIG. 18C via connector B. If EOVA is set, after Step 786, a variable for counting the number of EOV events (EOVEVENTS) is incremented at Step 790. Processing continues via connector B to FIG. 18C.

At Step 792, an end of input (EOV) variable for B is set to the V flag of B by extracting the V bit. If EOVB is set at Test Step 794, then Yes path 796 is taken to Step 798. The length of B (LEN B) is set to one. This causes the A-side of the input data to be passed through the PE to the output FIFO. The variable for counting the number of EOV events (EOVEVENTS) is incremented at Step 800. If EOVB is not set at Test Step 794, No path 802 is taken and processing ends via Exit 804.

Figure 19:
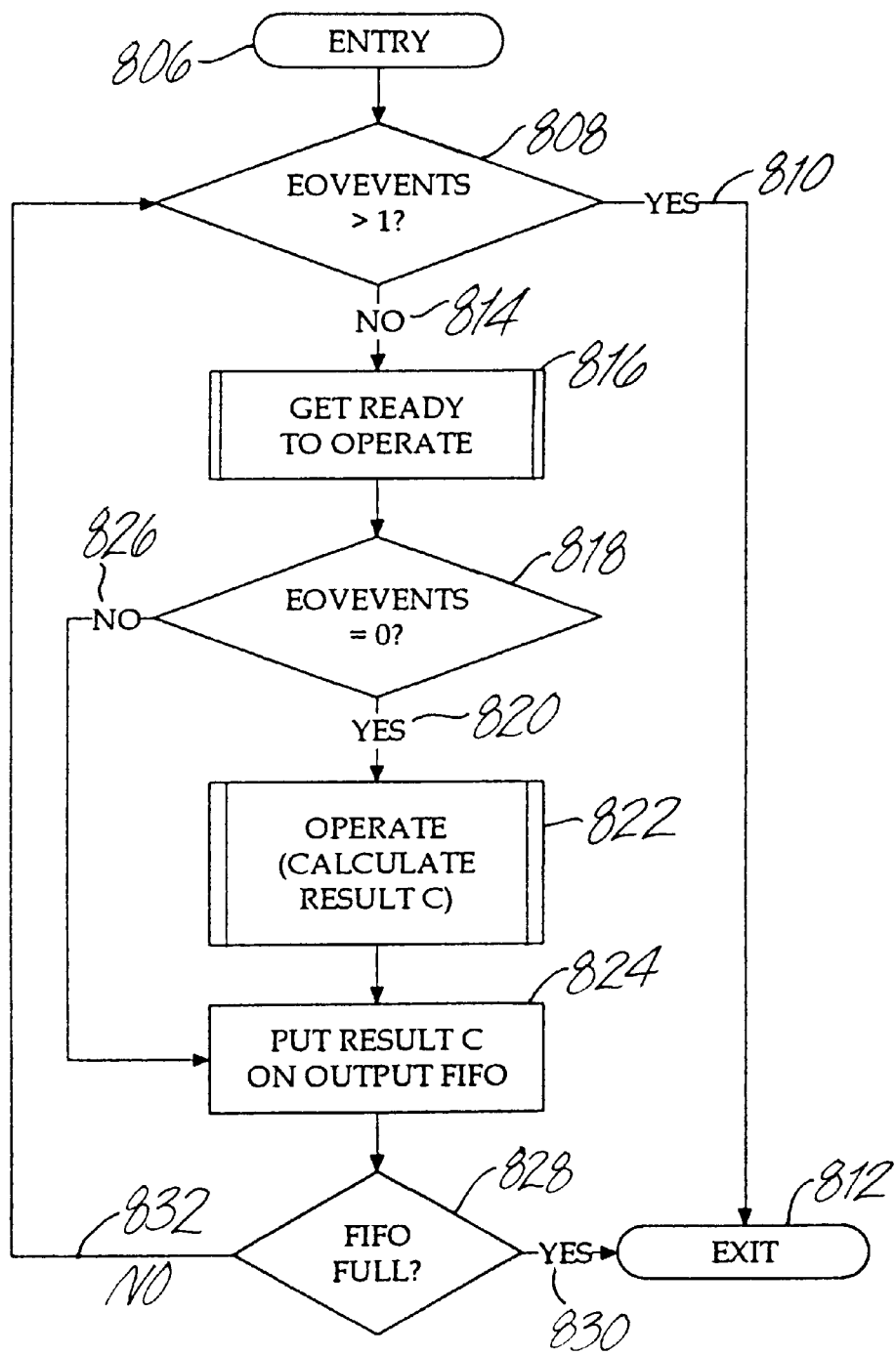
FIG. 19 is a flow chart of the processing steps performed by a Processing Element until both inputs are at an end of input state or until the output FIFO is full.

FIG. 19 is a flow chart of the processing steps performed by a PE until both inputs are at an EOV state or until the output FIFO is full. After Entry Step 806, the number of EOV events is tested at Test Step 808. If EOVEVENTS is greater than one, then no further processing is necessary for this PE, so Yes path 810 is taken to Exit 812. Otherwise, EOVEVENTS must be less than or equal to 1, so No path 814 is taken to Step 816. At this step, the process Get Ready To Operate is called to obtain the A-side and B-side input data. This process is described in further detail below with respect to FIGS. 20A–20C. At Test Step 818, if EOVEVENTS is zero, there is input data to be processed. Therefore, Yes path 820 is followed to Step 822, where the process Operate is called to calculate the result vector C. This process is described in further detail below with respect to FIG. 23.

Note that the result C is "pre-loaded" by the Get Ready For Operate logic. One of three conditions determines the contents of C. The first condition is when input bit unit A is at EOV, then input bit unit B is passed through as the output in result bit unit C. The second condition is when input bit unit B is at EOV, then input bit unit A is passed through as the output in result bit unit C. The third condition is when both of the inputs are at EOV, then a representation of EOV is passed through as the result bit unit C. When neither of the inputs are at EOV, the pre-loaded values in C are not used.

If EOVEVENTS was greater than zero at Test Step 818, then No path 826 is taken to Step 824. The result C is then put on the output FIFO at Step 824. Note that when the Yes path 820 is taken, the shorter length of bit unit A or bit unit B flows through the PE as the output in result C. The run and gender of result C is determined by the Operate process. Next, at Test Step 828, if the output FIFO is full, Yes path 830 is followed and processing ends at Exit 812. Otherwise, processing continues via No path 832 back to Test Step 808.

Figures 20A, 20B:
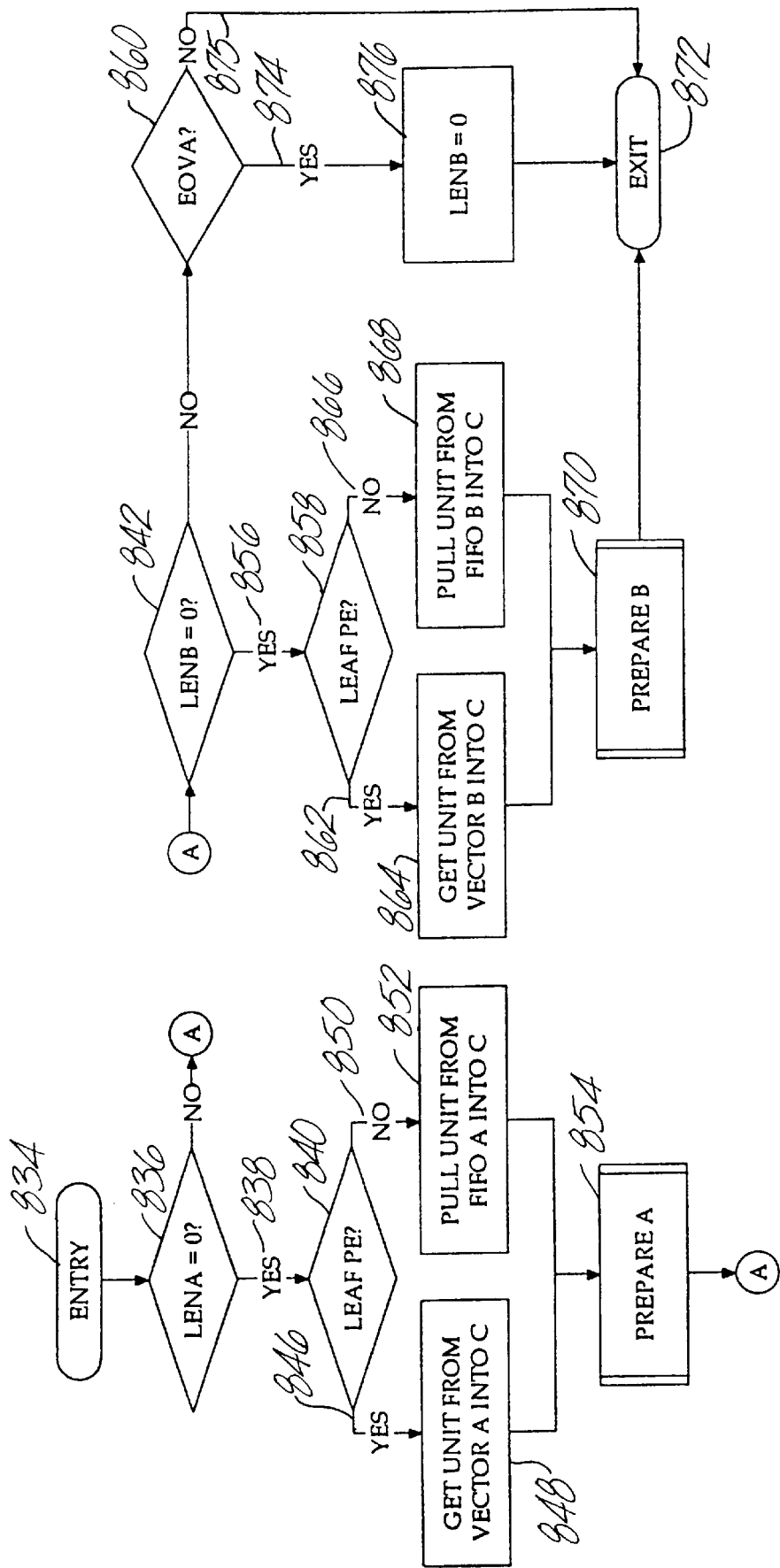
FIGS. 20A–20B are flow charts of the processing steps for the Get Ready To Operate process.

FIGS. 20A–20B are flow charts of the processing steps for the Get Ready To Operate process. After Entry 834, if the length of A (LEN A) is equal to zero at Test Step 836, then Yes path 838 is taken to Test Step 840. Otherwise, processing continues at Test Step 842 on FIG. 20B via connector A. When the length of A is zero and it is determined that the current PE is a leaf node at Test Step 840, Yes path 846 is taken to Step 848, otherwise No path 850 is taken to Step 852. At Step 848, a bit unit from input bit string A is obtained and loaded into output variable C for a leaf PE. At Step 852, a bit unit from input FIFO A is obtained and loaded into output variable C for an interior PE. Next, at Step 854, the Prepare A process is called to handle the A-side input data.

This process is described in further detail below with respect to FIG. 21. Get Ready To Operate processing continues with Test Step 842 on FIG. 20B.

At Test Step 842, if the length of B (LEN B) is equal to zero, then Yes path 856 is taken to Test Step 858. Otherwise, processing continues at Test Step 860. When the length of B is zero and it is determined that the current PE is a leaf node at Test Step 858, Yes path 862 is taken to Step 864, otherwise No path 866 is taken to Step 868. At Step 864, a bit unit from input bit vector B is obtained and loaded into output variable C for a leaf PE. At Step 868, a bit unit from input FIFO B is obtained and loaded into output variable C for an interior PE. Next, at Step 870, the Prepare B process is called to handle the B-side input data. This process is described in further detail below with respect to FIG. 22. Processing then ends via Exit 872.

If the length of B is not zero at Test Step 842, then processing continues at Test Step 860. At this step the EOVA flag is checked to determine if the A input bit unit is at an end of vector state. If it is, then Yes path 874 is taken to Step 876. The length of B (LEN B) is set to zero and processing ends at Exit 872. Otherwise, processing follows No path 875 and ends at Exit 872.

Figure 21:
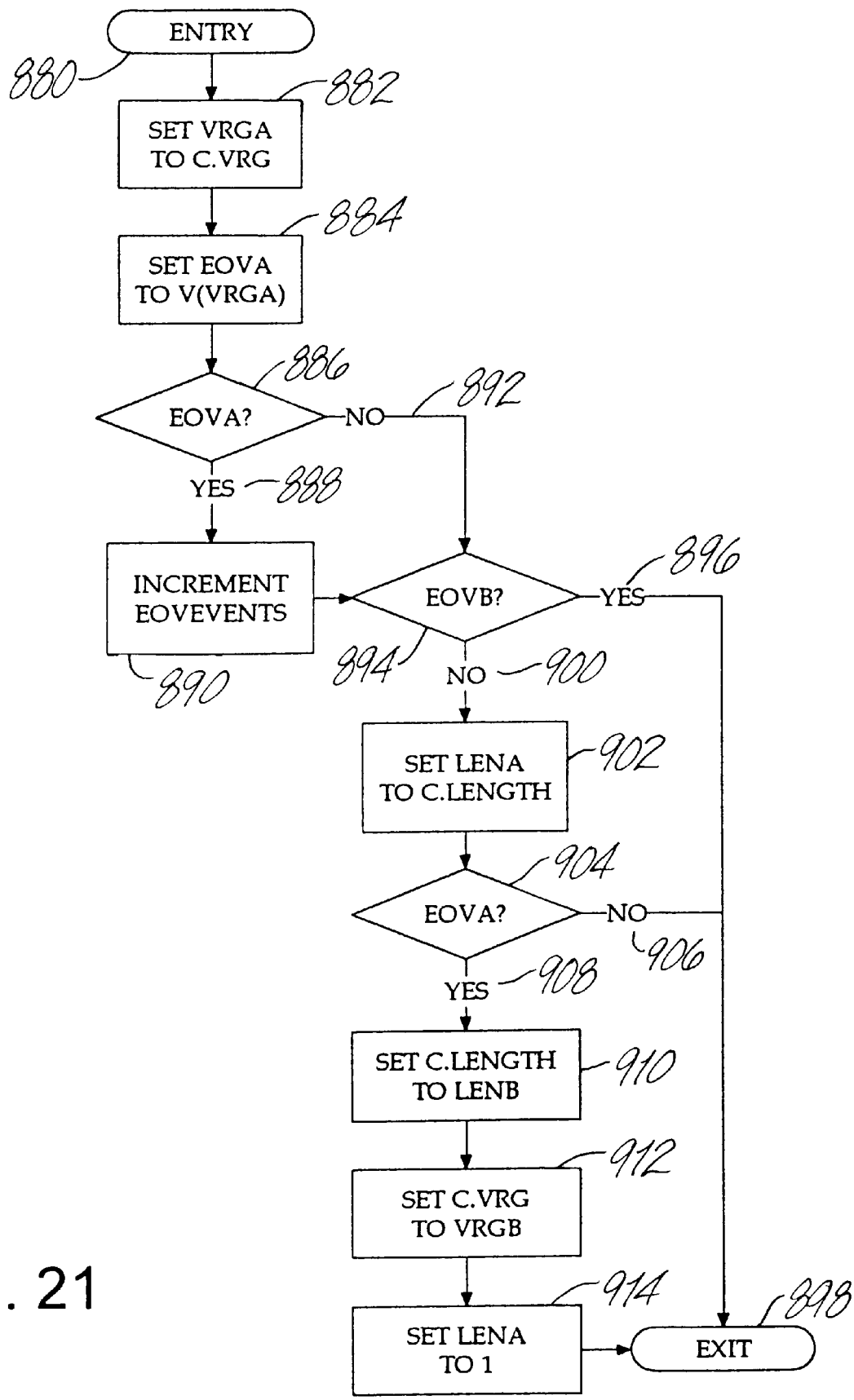
FIG. 21 is a flow chart of the steps for preparing the A-side inputs of a Processing Element.

FIG. 21 is a flow chart of the steps for preparing the A-side inputs. After Entry 880, a local variable VRGA is loaded with the V (end of input), R (run), and G (gender) flags of C at Step 882. The end of input flag for A (EOVA) is extracted from the local variable VRGA at Step 884. Next, EOVA is tested to determine if A is at an end of input state at Test Step 886. If so, Yes path 888 is taken to Step 890, where the EOVEVENTS counter is incremented to indicate that A is at end of input. Otherwise, No path 892 is taken to Test Step 894. At Test Step 894, the end of input flag for B (EOVB) is checked to determine if there is no more data on the B-side input of this PE to process. If so, Yes path 896 is taken to Exit 898. If EOVB indicates that more data is left to process, then No path 900 is taken to Step 902. At this step, the length of A (LENA) local variable is set to the length of C. If EOVA is not true, then No path 906 is taken to Exit 898 and Prepare A processing ends. Otherwise, Yes path 908 is taken to Step 910, where the length in C is set to the length of the B-side input (LENB). Next, at Step 912 the V, R, and G flags of C are set to the VRGB local variable. The length of the A-side input (LENA) is set to one at Step 914. These three steps will cause the B-side data to be passed through the PE. Prepare A processing ends at Exit 898.

Figure 22:
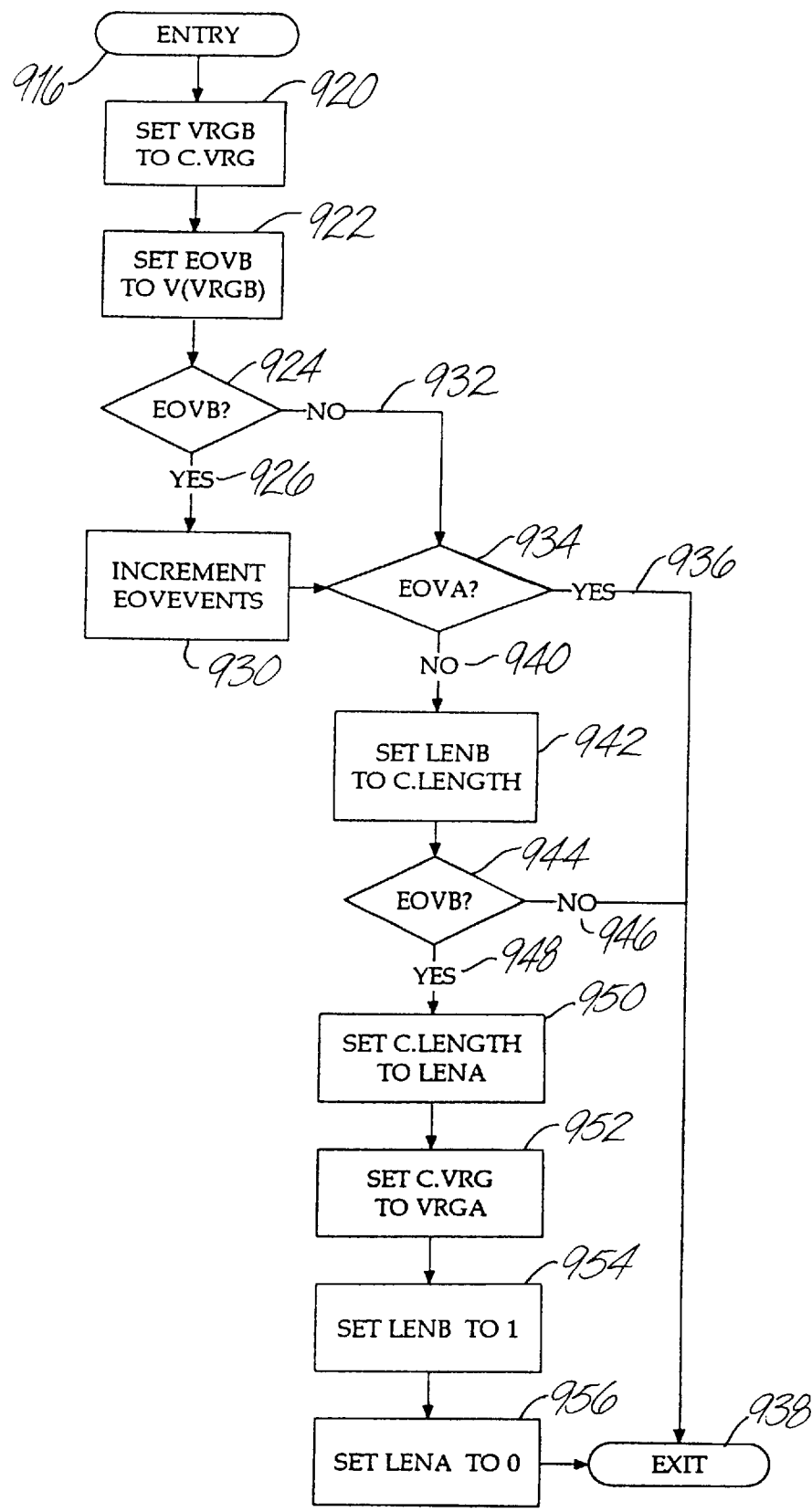
FIG. 22 is a flow chart of the steps for preparing the B-side inputs of a Processing Element.

FIG. 22 is a flow chart of the steps for preparing the B-side inputs. Note that the steps for handling the B-side inputs are very similar to those steps described above in FIG. 21 for handling the A-side inputs. After Entry 916, a local variable VRGB is loaded with the V (end of input), R (run), and G (gender) flags of C at Step 920. The end of input flag for B (EOVB) is extracted from the local variable VRGB at Step 922. Next, EOVB is tested to determine if B is at an end of input state at Test Step 924. If so, Yes path 926 is taken to Step 930, where the EOVEVENTS counter is incremented to indicate that one of the inputs are at end of input. Otherwise, No path 932 is taken to Test Step 934. At Test Step 934, the end of input flag for A (EOVA) is checked to determine if there is no more data on the A-side input of this PE to process. If so, Yes path 936 is taken to Exit 938. If EOVA indicates that more data is left to process, then No path 940 is taken to Step 942. At this step, the length of B (LENB) local variable is set to the length of C. If EOVB is not at end of input, then No path 946 is taken to Exit 938 and Prepare B processing ends. Otherwise, Yes path 948 is taken to Step 950, where the length in C is set to the length of the A-side input (LENA). Next, at Step 952 the V, R, and G flags of C are set to the VRGA local variable. The length of the B-side input (LENB) is set to one at Step 954. These three steps will cause the A-side data to be passed through the PE. Finally, the length of A (LENA) is set to zero and Prepare A processing ends at Exit 938.

Figure 23:
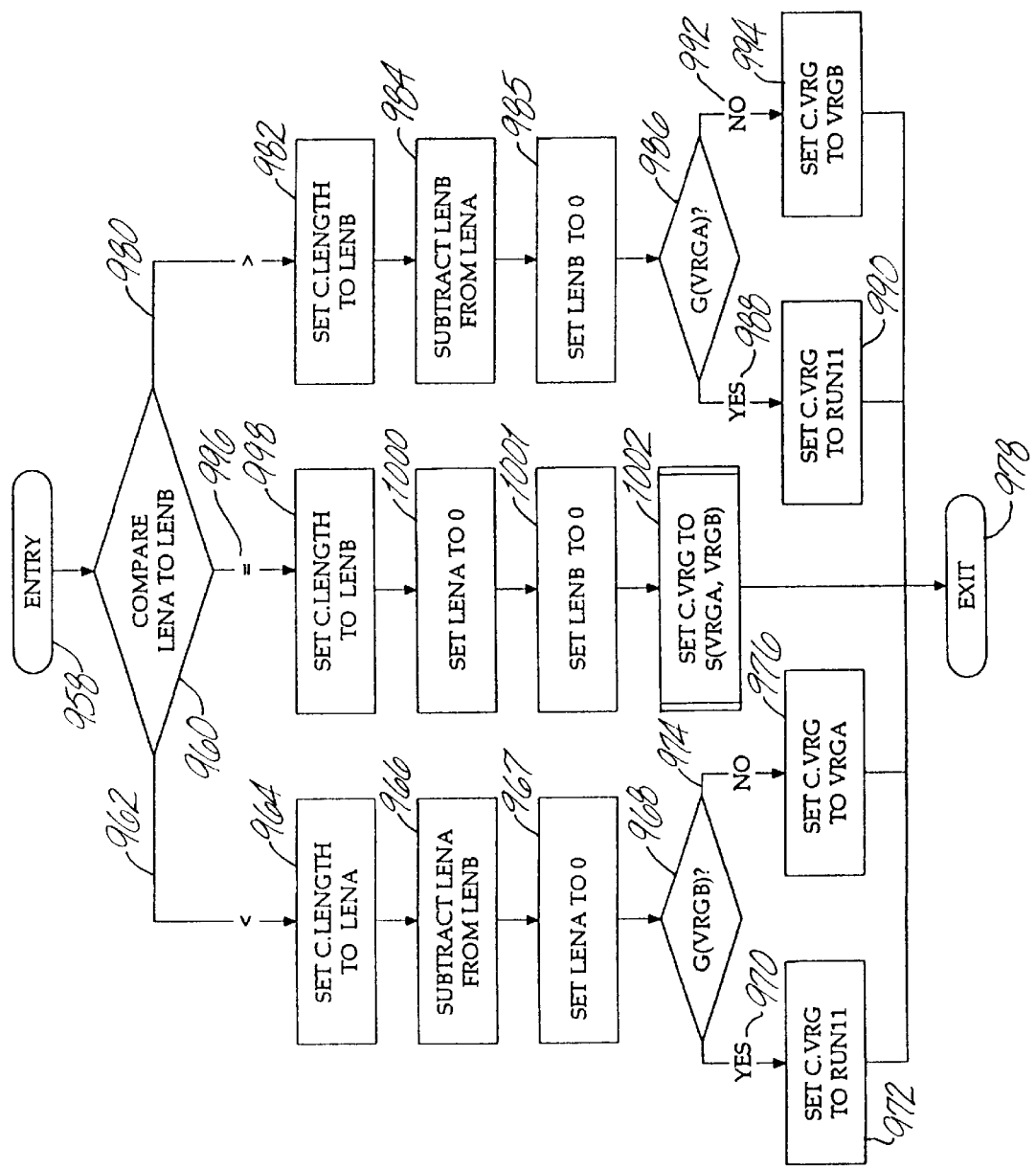
FIG. 23 is a flow chart of the steps for performing a boolean "OR" operation on the A-side and B-side inputs for the current Processing Element.

FIG. 23 is a flow chart of the steps for performing a boolean "OR" operation on the A-side and B-side inputs for the current Processing Element. After Entry 958, the length of the A-side input (LENA) is compared to the length of the B-side input (LENB) at Test Step 960.

If LENA is less than LENB, path 962 is taken to Step 964, where the length field in C is set to LENA. Next, at Step 966, LENA is subtracted from LENB. At Step 967, LENA is set to zero. At Test Step 968, the gender flag is extracted from the VRGB local variable and tested. The function G(x) extracts the gender bit of x. If the B-side input has the gender bit set, then Yes path 970 is taken to Step 972, where the VRG field of C is set to indicate a run of gender one. Otherwise, the B-side does not have the gender bit set, so No path 974 is taken to Step 976. At this step, the VRG field of C is set to the contents of the VRGA local variable. Processing ends via Exit 978.

Referring back to Test Step 960, if LENA is greater than LENB, path 980 is taken to Step 982, where the length field in C is set to LENB. Next, at Step 984, LENB is subtracted from LENA. At Step 985, LENB is set to zero. At Test Step 986, the gender flag is extracted from the VRGA local variable and tested. If the A-side input has the gender bit set, then Yes path 988 is taken to Step 990, where the VRG field of C is set to indicate a run of gender one. Otherwise, the A-side does not have the gender bit set, so No path 992 is taken to Step 994. At this step, the VRG field of C is set to the contents of the VRGB local variable. Processing ends via Exit 978.

Referring back to Test Step 960, if LENA is equal to LENB, path 996 is taken to Step 998, where the length field of C is set to LENB. At Step 1000, local variables LENA is set to zero. At Step 1001, local variable LENB is set to zero. At Step 1002, the VRG field of C is set to indicate a run/gender calculation of VRGA and VRGB according to function S as described below in Table I.

TABLE I

|             | G(VRGB) = 0 | G(VRGB) = 1 |
|-------------|-------------|-------------|
| G(VRGA) = 0 | 00          | 11          |
| G(VRGA) = 1 | 11          | 01          |

When the A-side input and the B-side input are equal in length, the run and gender bits of result C (as stored in C.VRG) is a function of two variables, the gender of A (G(VRGA)) and the gender of B (G(VRGB)) as shown in the table. Note that the run/gender calculation table shown matches the run and gender calculation tables provided by the minima method as described in U.S. Pat. No. 5,036,457 to Glaser et al. However, only the boolean "OR" operation is used in the data flow machine.

Figure 24:
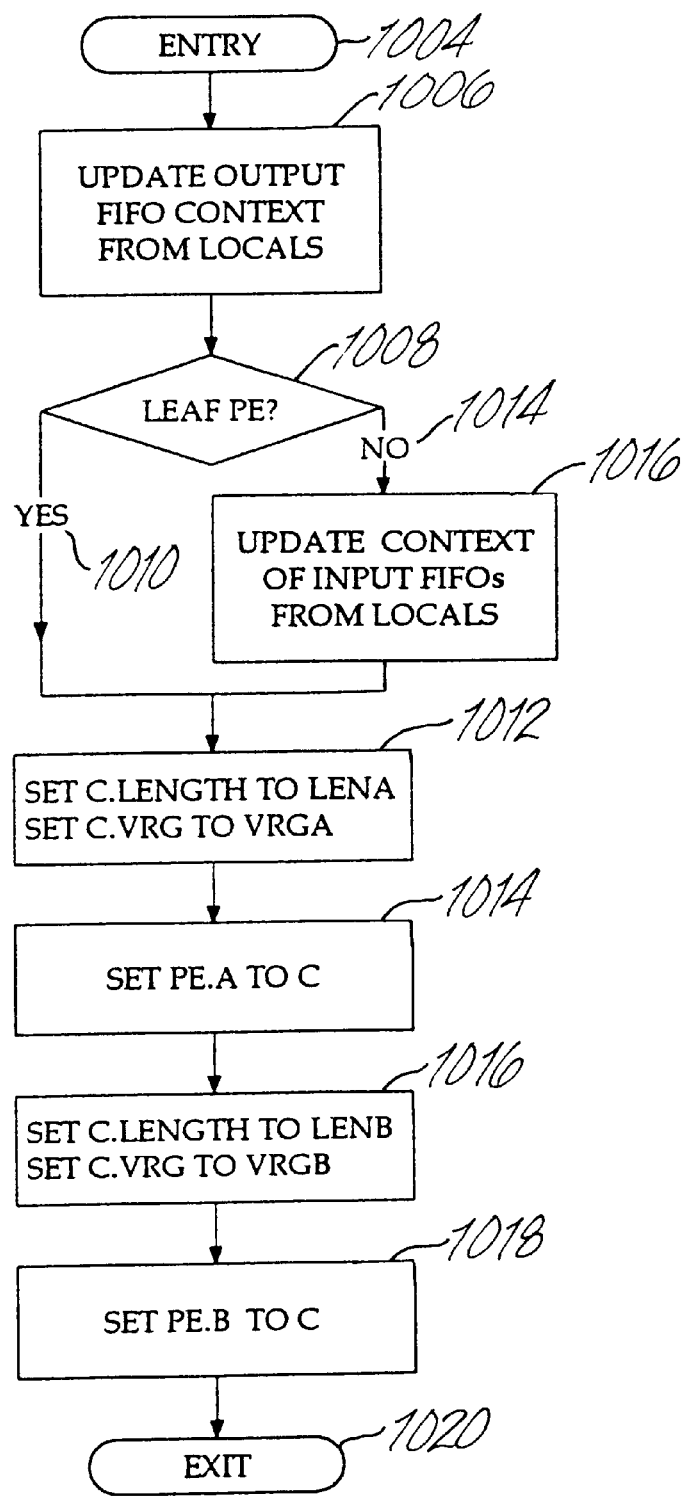
FIG. 24 is a flow chart of the steps for restoring the Processing Element fields with the contents of the local variables.

FIG. 24 is a flow chart of the steps for restoring the PE fields with the contents of the local variables. After Entry 1004, the context (Head index 476, Tail index 478, and Count field 480) of the output FIFO is set using the local variables at Step 1006. At Test Step 1008, if the current PE is a leaf node, then Yes path 1010 is taken to Step 1012. Otherwise, the current PE is an interior node and No path 1014 is taken to Step 1016, where the context (Head index 476, Tail index 478, and Count field 438) of the input FIFOs are set using the local variables. Next, at Step 1012, the length of C is set to LENA and the V, R, and G flags of C are set to VRGA. The values in C are then loaded into the A-side of the current PE at Step 1014. At Step 1016, the length of C is set to LENB and the V, R, and G flags of C are set to VRGB. The values in C are then loaded into the B-side of the current PE at Step 1018. Processing ends at Exit 1020.

Figure 25:
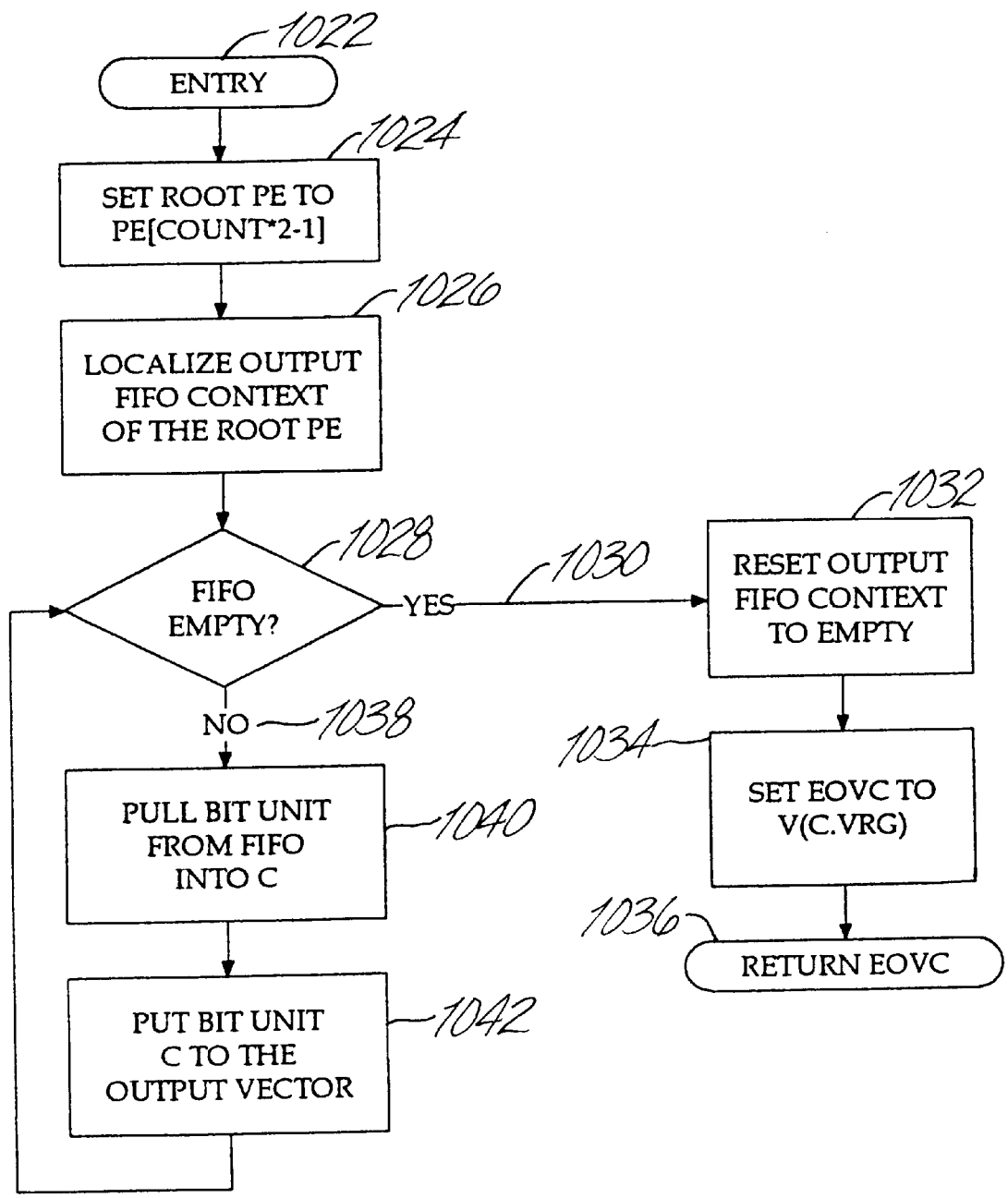
FIG. 25 is a flow chart of the steps for generating the output bit string.

FIG. 25 is a flow chart of the steps for generating the output bit vector. After Entry 1022, the root PE is set to the last PE processed at Step 1024. This PE is indexed by the expression Count multiplied by two minus one. Next, at Step 1026, the context (Head index 476, Tail index 478, and Count field 480) of the output FIFO is set for the root PE. At Test Step 1028, if the output FIFO is empty, then Yes path 1030 is taken to Step 1032. At this step, the context of the output FIFO is reset to empty. The end of input flag for C (EOVC) is set to the current value of the V flag extracted from local data structure C at Step 1034. The variable EOVC indicates when the end of input state has been reached for the output bit vector. Generate output bit vector processing ends by returning the EOVC value to the caller at 1036. If at Test Step 1028 the output FIFO was not empty, then No path 1038 is taken to Step 1040. At this step, the bit unit from the output FIFO is stored into C. Next, the bit unit in C is stored in the output vector at Step 1042. Processing continues back at Test Step 1028 to check for more output data in the output FIFO.

Figure 26:
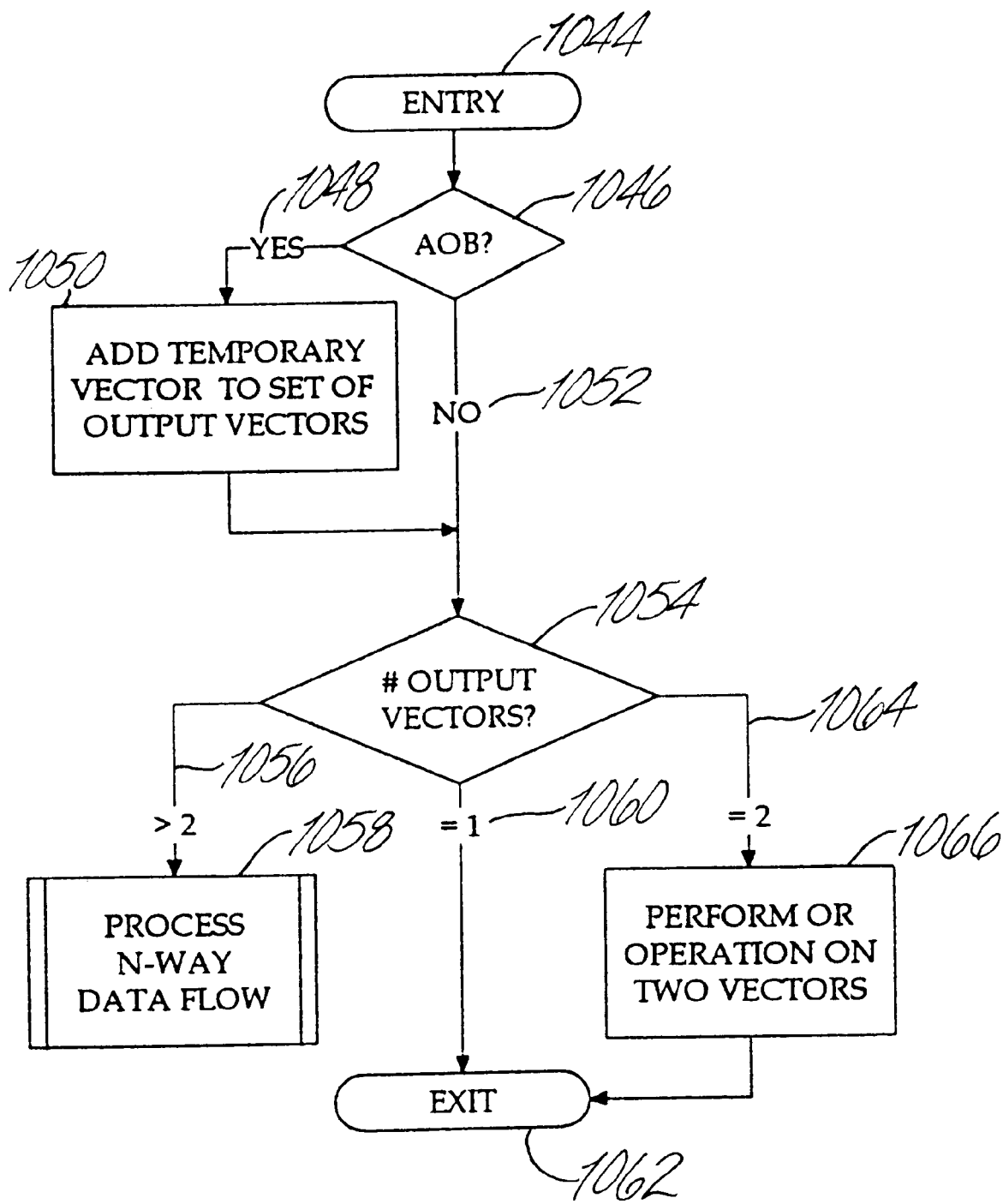
FIG. 26 is a flow chart of the steps for processing the output strings.

FIG. 26 is a flow chart of the steps for processing the output bit vectors. Note that when the number of input bit vectors is greater than the predetermined maximum number of inputs processed at a time by one data flow machine, the extra inputs must be handled by another instance of the data flow machine. After Entry 1044, the AoB flag is checked at Test Step 1046. If the AoB flag is true (i.e., set to one), then an odd number of input bit vectors was input to the data flow machine. Accordingly, Yes path 1048 is taken to Step 1050, where a temporary vector is added to the set of output vectors. This temporary vector represents the odd-numbered input bit vector. If the AoB flag is false, then No path 1052 is followed. At Test Step 1054, if the number of output vectors is greater than two, then further processing must be performed on these vectors. Therefore, path 1056 is followed and a recursive call is made to the N-Way Processing Of Bit Vectors function, passing in the current set of output vectors as input data. If the number of output vectors is equal to one at Test Step 1054, then the complete set of input bit vectors has been processed to result in a single output bit vector. Therefore, path 1060 is taken and processing ends via Exit 1062. Otherwise, the number of output vectors is equal to two. In this case, path 1064 is followed to Step 1066, where a boolean "OR" operation is performed on the two remaining vectors to produce a single output bit vector. Processing then ends at Exit 1062.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patent is set forth in the appended claims.

What is claimed is:

1. In a system having a plurality of processing elements in a dataflow architecture, each leaf node processing element taking two input bit strings as input data and performing a boolean operation on the two input bit strings to produce output bit units, a computer-implemented method of performing the boolean operation on a plurality of input bit strings to produce one resultant bit string comprising the steps of:

attaching each pair of input bit strings to selected ones of the processing elements;

connecting the processing elements to form a binary tree having a plurality of levels, wherein the selected processing elements are leaf nodes of the binary tree, output bit units of the selected processing elements being input to intermediate processing elements which are non-leaf nodes at a level of the binary tree lower than the leaf nodes, output bit units of the intermediate processing elements being input to other intermediate processing elements at lower levels of the binary tree, the resultant bit string being output by a root processing element which is a root node of the binary tree; and processing all leaf nodes of the binary tree by performing the boolean operation on the input bit vectors to the selected processing elements to produce output bit units, the output bit units becoming input bit units to the intermediate processing elements, processing all non-leaf nodes of the binary tree by performing the boolean operation on input bit units to the intermediate processing elements to produce output bit units, and processing the root node of the binary tree by performing the boolean operation on input bit units to the root processing element to produce the resultant bit string.

2. The method of claim 1, wherein the connecting step connects FIFOs holding the output bit units from the selected processing elements to the intermediate processing elements, from the intermediate processing elements to the intermediate processing elements at lower levels of the binary tree, and from two intermediate processing elements to the root node.

3. The method of claim 2, wherein processing of all non-leaf nodes and the root node is performed when the input bit units for the non-leaf nodes and the root node are available as inputs from the FIFOs.

4. The method of claim 1, further comprising the steps of saving a last odd-numbered input bit string and combining the last odd-numbered input bit string with the resultant bit string according to the boolean operation when the number of input bit strings is odd.

5. The method of claim 1, wherein the boolean operation is an OR operation.

6. The method of claim 1, wherein the attaching step comprises the steps of:

(A) selecting one of the processing elements;

(B) attaching a first input bit string to a first input of the selected one of the processing elements;

(C) attaching a second input bit string to a second input of the selected one of the processing elements; and (D) repeating steps (A)–(C) for each pair of input bit strings.

7. The method of claim 2, wherein the connecting step comprises the steps of:

(A) initializing fields of the processing elements;

(B) attaching a first input of a first selected one of the non-leaf processing elements to an output bit unit FIFO of a first processing element at a level of the binary tree higher than the level of the first selected one of the non-leaf processing elements;

(C) attaching a second input of the first selected one of the non-leaf processing elements to an output bit unit FIFO of a second processing element at a level of the binary tree higher than the level of the first selected one of the non-leaf processing elements; and (D) repeating steps (B) and (C) for all non-leaf processing elements.

8. The method of claim 7, wherein the connecting step further comprises the steps of:

attaching a first input of the root processing element to an output bit unit FIFO of a processing element at a level of the binary tree higher than the level of the root processing element; and attaching a second input of the root processing element to an output bit unit FIFO of another processing element at a level of the binary tree higher than the level of the root processing element.

9. The method of claim 2, wherein the processing all leaf nodes, all non-leaf nodes, and root node step comprises the steps of:

(A) initializing the resultant bit string for the binary tree;

(B) performing the boolean operation on the input bit units to a selected processing element until all data of at least one of the inputs have been exhausted or until the FIFO buffering the output bit units for the selected processing element is full;

(C) repeating step (B) for all processing elements;

(D) moving data stored in the FIFO buffering the output bit units of the root node to the resultant bit string; and (E) repeating steps (B)–(D) until all data in all input bit strings have been processed.

10. The method of claim 1, wherein the input bit vectors are represented by attributes including a characteristic type indicating whether the input data is a run or an impulse, a gender type indicating a binary value of the run or the impulse, and a length indicating a number of bits occurring in the input data.

11. The method of claim 10, wherein the run is a bit string having one or more contiguous bits of a binary value.

12. The method of claim 10, wherein the impulse is a bit string having one or more contiguous bits of a binary value followed by an ending bit having an opposite binary value.

13. A system for performing boolean operations on a plurality of input bit strings to produce a resultant bit string comprising:

a plurality of processing elements, each processing element comprising means for performing boolean operations on a pair of input bit units to produce an output bit unit;

means for attaching each pair of input bit strings to selected ones of the processing elements;

means for connecting the processing elements to form a binary tree having a plurality of levels, wherein the selected processing elements are leaf nodes of the binary tree, output bit units of the selected processing elements being input to intermediate processing elements which are non-leaf nodes at a level of the binary tree lower than the leaf nodes, output bit units of the intermediate processing elements being input to other intermediate processing elements at lower levels of the binary tree, the resultant bit vector being output by a root processing element which is a root node of the binary tree; and means for processing all leaf nodes of the binary tree by initiating boolean operations on the input bit vectors to the selected processing elements to produce output bit units, the output bit units becoming input bit units to the intermediate processing elements, processing all non-leaf nodes of the binary tree by initiating boolean operations on input bit units to the intermediate processing elements to produce output bit units, and processing the root node of the binary tree by initiating boolean operations on input bit units to the root processing element to produce the resultant bit string.

14. The system of claim 13, further comprising a plurality of FIFOs for holding the output bit units from the selected processing elements to the intermediate processing elements, from the intermediate processing elements to the intermediate processing elements at lower levels of the binary tree, and from two intermediate processing elements to the root node.

15. The system of claim 14, wherein the processing means initiates processing of all non-leaf nodes and the root node when the input bit units for the non-leaf nodes and the root node are available as inputs from the FIFOs.

16. The system of claim 13, further comprising:

means for saving a last odd-numbered input bit string; and means for combining the last odd-numbered input bit string with the resultant bit string according to the boolean operation when the number of input bit strings is odd.

17. The system of claim 13, wherein the boolean operation is an OR operation.

18. The system of claim 13, wherein the attaching means comprises:

means for selecting one of the processing elements;

means for attaching a first input bit string to a first input of the selected one of the processing elements; and means for attaching a second input bit string to a second input of the selected one of the processing elements.

19. The system of claim 13, wherein the connecting means comprises:

means for initializing fields of the processing elements;

means for attaching a first input of a first selected one of the non-leaf processing elements to an output bit unit FIFO of a first processing element at a level of the binary tree higher than the level of the first selected one of the non-leaf processing elements; and means for attaching a second input of the first selected one of the non-leaf processing elements to an output bit unit FIFO of a second processing element at a level of the binary tree higher than the level of the first selected one of the non-leaf processing elements.

20. The system of claim 19, wherein the connecting means further comprises:

means for attaching a first input of the root processing element to a first output bit unit FIFO of a processing element at a level of the binary tree higher than the level of the root processing element; and means for attaching a second input of the root processing element to an output bit unit FIFO of another processing element at a level of the binary tree higher than the level of the root processing element.

21. The system of claim 14, wherein the processing means comprises:

means for initializing the resultant bit string for the binary tree;

means for controlling performance of the boolean operation on the input bit units to a selected processing element until all data of at least one of the inputs of the selected processing element have been processed or until the FIFO buffering the output bit units for the selected processing element is full; and means for transferring data stored in the FIFO buffering the output bit units of the root node to the resultant bit string.

22. The system of claim 13, wherein the input bit units are represented by attributes including a characteristic type indicating whether the input data is a run or an impulse, a gender type indicating a binary value of the run or the impulse, and a length indicating a number of bits occurring in the input data.

23. The system of claim 22, wherein the run is a bit vector having one or more contiguous bits of a binary value.

24. The system of claim 22, wherein the impulse is a bit vector having one or more contiguous bits of a binary value followed by an ending bit having an opposite binary value.

25. In a relational database management system having a plurality of processing elements in a dataflow architecture, each processing element taking two input bit vectors as input data and performing a boolean operation on the two input bit vectors to produce an output bit vector, a computer-implemented method of creating binary representations of relations in the relational database, compressing the binary representations into bit vectors, and performing boolean operations on a plurality of input bit vectors to produce one resultant bit vector satisfying a query of the relational database comprising the steps of:

creating binary representations of relations in the relational database, each of said binary representations comprising an encoded string of consecutive binary bits;

separating each said string into one or more compressed impulses, which together constitute substantially the entire string, each said one or more compressed impulses comprising a run of one or more contiguous bits of the same polarity of the string and followed by a next bit having an opposite polarity;

encoding each of said one or more compressed impulses into a corresponding sequence of encoded impulse formats, said encoded impulse formats forming an input bit vector;

attaching each pair of input bit vectors to selected ones of the processing elements;

connecting the processing elements to form a binary tree having a plurality of levels, wherein the selected processing elements are leaf nodes of the binary tree, output bit units of the selected processing elements being input to intermediate processing elements which are non-leaf nodes at a level of the binary tree lower than the leaf nodes, output bit units of the intermediate processing elements being input to other intermediate processing elements at lower levels of the binary tree, the resultant bit vector being output by a root processing element which is a root node of the binary tree; and processing all leaf nodes of the binary tree by performing the boolean operation on the input bit vectors to the selected processing elements to produce output bit units, the output bit units becoming input bit units to the intermediate processing elements, processing all non-leaf nodes of the binary tree by performing the boolean operation on input bit units to the intermediate processing elements to produce output bit units, and processing the root node of the binary tree by performing the boolean operation on input bit units to the root processing element to produce the resultant bit vector satisfying the query.

26. The method of claim 25, wherein the connecting step connects FIFOs holding the output bit units from the selected processing elements to the intermediate processing elements, from the intermediate processing elements to the intermediate processing elements at lower levels of the binary tree, and from two intermediate processing elements to the root node.

27. The method of claim 26, wherein processing of all non-leaf nodes and the root node is performed when the input bit units for the non-leaf nodes and the root node are available as inputs from the FIFOs.

28. The method of claim 25, further comprising the steps of saving a last odd-numbered input bit vector and combining the last odd-numbered input bit vector with the resultant bit vector according to the boolean OR operation when the number of input bit vectors is odd.

29. The method of claim 25, wherein the attaching step comprises the steps of:

(A) selecting one of the processing elements;

(B) attaching a first input bit vector to a first input of the selected one of the processing elements;

(C) attaching a second input bit vector to a second input of the selected one of the processing elements; and (D) repeating steps (A)–(C) for each pair of input bit vectors.

30. The method of claim 25, wherein the connecting step comprises the steps of:

(A) initializing fields of the processing elements;

(B) attaching a first input of a first selected one of the non-leaf processing elements to an output bit unit FIFO of a first processing element at a level of the binary tree higher than the level of the first selected one of the non-leaf processing elements;

(C) attaching a second input of the first selected one of the non-leaf processing elements to an output bit unit FIFO of a second processing element at a level of the binary tree higher than the level of the first selected one of the non-leaf processing elements; and (D) repeating steps (B) and (C) for all non-leaf processing elements.

31. The method of claim 30, wherein the connecting step further comprises the steps of:

attaching a first input of the root processing element to an output bit unit FIFO of a processing element at a level of the binary tree higher than the level of the root processing element; and attaching a second input of the root processing element to an output bit unit FIFO of another processing element at a level of the binary tree higher than the level of the root processing element.

32. The method of claim 26, wherein the processing all leaf nodes, all non-leaf nodes, and root node step comprises the steps of:

(A) initializing the resultant bit vector for the binary tree;

(B) performing the boolean OR operation on the input bit units to a selected processing element until all data of at least one of the inputs have been processed or until the FIFO buffering the output bit units for the selected processing element is full;

(C) repeating step (B) for all processing elements;

(D) moving data stored in the FIFO buffering the output bit units of the root node to the resultant bit vector; and (E) repeating steps (B)–(D) until all data in all input bit vectors have been processed.

33. A system for performing boolean operations on a plurality of input bit vectors representing relations in a relational database to produce a resultant bit vector satisfying a query of the relational database, said system comprising:

means for creating binary representations of relations in the relational database, each of said binary representations comprising a string of consecutive binary bits;

means for separating each said string into one or more compressed impulses, which together constitute substantially the entire string, each said one or more compressed impulses comprising a run of one or more contiguous bits of the same polarity of the string and followed by a next bit having an opposite polarity;

means for encoding each of said one or more compressed impulses into a corresponding sequence of encoded impulse formats, said encoded impulse formats forming a bit vector;

a plurality of processing elements, each processing element comprising means for performing boolean operations on a pair of input bit units to produce an output bit unit;

means for attaching each pair of input bit vectors to selected ones of the processing elements;

means for connecting the processing elements to form a binary tree having a plurality of levels, wherein the selected processing elements are leaf nodes of the binary tree, output bit units of the selected processing elements being input to intermediate processing elements which are non-leaf nodes at a level of the binary tree lower than the leaf nodes, output bit units of the intermediate processing elements being input to other intermediate processing elements at lower levels of the binary tree, the resultant bit vector being output by a root processing element which is a root node of the binary tree; and means for processing all leaf nodes of the binary tree by initiating boolean operations on the input bit vectors to the selected processing elements to produce output bit units, the output bit units becoming input bit units to the intermediate processing elements, processing all non-leaf nodes of the binary tree by initiating boolean operations on input bit units to the intermediate processing elements to produce output bit units, and processing the root node of the binary tree by initiating boolean operations on input bit units to the root processing element to produce the resultant bit vector satisfying the query.

34. The system of claim 33, further comprising a plurality of FIFOs for holding the output bit units from the selected processing elements to the intermediate processing elements, from the intermediate processing elements to the intermediate processing elements at lower levels of the binary tree, and from two intermediate processing elements to the root node.

35. The system of claim 34, wherein the processing means initiates processing of all non-leaf nodes and the root node when the input bit units for the non-leaf nodes and the root node are available as inputs from the FIFOs.

36. The system of claim 33, further comprising:

means for saving a last odd-numbered input bit vector; and means for combining the last odd-numbered input bit vector with the resultant bit vector according to the boolean operation when the number of input bit vectors is odd.

37. The system of claim 33, wherein the attaching means comprises:

means for selecting one of the processing elements;

means for attaching a first input bit vector to a first input of the selected one of the processing elements; and means for attaching a second input bit vector to a second input of the selected one of the processing elements.

38. The system of claim 33, wherein the connecting means comprises:

means for initializing fields of the processing elements;

means for attaching a first input of a first selected one of the non-leaf processing elements to an output bit unit FIFO of a first processing element at a level of the binary tree higher than the level of the first selected one of the non-leaf processing elements; and means for attaching a second input of the first selected one of the non-leaf processing elements to an output bit unit FIFO of a second processing element at a level of the binary tree higher than the level of the first selected one of the non-leaf processing elements.

39. The system of claim 38, wherein the connecting means further comprises:

means for attaching a first input of the root processing element to an output bit unit FIFO of a processing element at a level of the binary tree higher than the level of the root processing element; and means for attaching a second input of the root processing element to an output bit unit FIFO of another processing element at a level of the binary tree higher than the level of the root processing element.

40. The method of claim 34, wherein the processing means comprises:

means for initializing the resultant bit vector for the binary tree;

means for controlling performance of the boolean OR operation on the input bit units to a selected processing element until all data of at least one of the inputs to the selected processing element have been processed or until the FIFO buffering the output bit units for the selected processing element is full; and means for transferring data stored in the FIFO buffering the output bit units of the root node to the resultant bit vector.

* * * * *

UNITED STATES PATENT AND TRADEMARK OFFICE
CERTIFICATE OF CORRECTION

PATENT NO. : 5,974,411 Page 1 of 1
DATED : October 26, 1999
INVENTOR(S) : Michael W. McCool and Jean A. Marquis It is certified that error appears in the above-identified patent and that said Letters Patent is hereby corrected as shown below:

Title page,
Item [73], Assignee, the Assignee should read:
-- Sand Technology Systems International, Inc., Westmount, Canada --

Item [56], References Cited, OTHER PUBLICATIONS,
Replace "Aderson "Sublogarithmic Searching Without Multiplications", IEEE, pp. 655-663, 195." with -- Anderson "Sublogarithmic Searching Without Multiplications," IEE, pp. 655-663, 1995. --.

Replace Chiueh et al. "Vector Quantization Using Tree-Structured Self-Organizing Feature Maps" IEEE Journal o Selected Areas i Communications, vol. 12, No. 9 pp. 1594-1599, Dec. 1994." with -- Vector Quatization Using Tree-Structured Self-Organizing Feature Maps," IEEE Journal on Selected Areas in Communications, vol. 12, No. 9, pp. 1594-1599, Dec. 1994. --.

Replace Masui "Keyword Dictionary Compression Using Trie Implementation", IEEE, pp. 438, 1991." with -- Masui "Keyword Dictionary Compression Using Efficient Trie Implementation," IEEE, pp. 438, 1991. --.

Column 26,
Line 51, after "wherein" delete "the"

Column 28,
Line 9, replace "boolean operation" with -- boolean OR operation --.

Signed and Sealed this

Tenth Day of September, 2002

*Attest:*

*Attesting Officer*

JAMES E. ROGAN
Director of the United States Patent and Trademark Office